US012535718B2

(12) United States Patent
Wang

(10) Patent No.: US 12,535,718 B2
(45) Date of Patent: Jan. 27, 2026

(54) VOICE COIL MOTOR, CAMERA, AND ELECTRONIC DEVICE

(71) Applicant: GUANGDONG OPPO MOBILE TELECOMMUNICATIONS CORP., LTD., Guangdong (CN)

(72) Inventor: Weicheng Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 323 days.

(21) Appl. No.: 18/447,282

(22) Filed: Aug. 9, 2023

(65) Prior Publication Data

US 2023/0393450 A1    Dec. 7, 2023

Related U.S. Application Data

(63) Continuation of application No. PCT/CN2022/072697, filed on Jan. 19, 2022.

(30) Foreign Application Priority Data

Mar. 8, 2021 (CN) .......................... 202110252510.8

(51) Int. Cl.
*G03B 13/36* (2021.01)
*H02K 11/225* (2016.01)
(Continued)

(52) U.S. Cl.
CPC ........... *G03B 13/36* (2013.01); *H02K 11/225* (2016.01); *H02K 41/0354* (2013.01); *H04N 23/687* (2023.01)

(58) Field of Classification Search
CPC .. G03B 13/36; H02K 11/225; H02K 41/0354; H04N 23/687
See application file for complete search history.

(56) References Cited

U.S. PATENT DOCUMENTS 10,715,730 B1    7/2020 Xu et al.
2017/0351158 A1*  12/2017 Kudo .................... G03B 13/36
2020/0333686 A1  10/2020 Kim

FOREIGN PATENT DOCUMENTS

CN    201402344    2/2010
CN    102820759    12/2012
(Continued)

OTHER PUBLICATIONS

CNIPA, First Office Action for CN Application No. 202110252510.8, Dec. 1, 2021.
(Continued)

*Primary Examiner* — Nathanael R Briggs
(74) *Attorney, Agent, or Firm* — Hodgson Russ LLP

(57) ABSTRACT

A voice coil motor is provided in the disclosure. The voice coil motor includes a frame, a magnetic member disposed at the frame, a coil assembly received in an inner cavity of the frame, a first resilient member, a planar coil, and a base. The magnetic member is disposed around the coil assembly. The planar coil is disposed on the base. The frame is disposed on the planar coil. The first resilient member includes a first connection ring connected to the coil assembly and a first positioning portion. The coil assembly is connected to the frame via the first positioning portion. The first positioning portion is configured to reset the coil assembly after movement of the coil assembly relative to the frame. A positioning mechanism is disposed between the frame and the base and configured to reset the frame after movement of the frame relative to the base.

19 Claims, 17 Drawing Sheets

(51) Int. Cl.
*H02K 41/035* (2006.01)
*H04N 23/68* (2023.01)

(56) References Cited

FOREIGN PATENT DOCUMENTS

| CN | 103185942 | 7/2013 |
|---|---|---|
| CN | 104079138 | 10/2014 |
| CN | 104570547 | 4/2015 |
| CN | 204903924 | 12/2015 |
| CN | 107247382 | 10/2017 |
| CN | 107277338 | 10/2017 |
| CN | 104407487 | 2/2018 |
| CN | 107707083 | 2/2018 |
| CN | 207200555 | 4/2018 |
| CN | 207676095 | 7/2018 |
| CN | 108377087 | 8/2018 |
| CN | 108490579 | 9/2018 |
| CN | 208156280 | 11/2018 |
| CN | 208158393 | 11/2018 |
| CN | 110780507 | 2/2020 |
| CN | 111083340 | 4/2020 |
| CN | 111147708 | 5/2020 |
| CN | 211508878 | 9/2020 |
| CN | 211530986 | 9/2020 |
| CN | 112415708 | 2/2021 |
| CN | 112886788 | 6/2021 |
| EP | 3239755 | 11/2017 |
| EP | 3521922 | 8/2019 |
| EP | 3588185 | 1/2020 |
| EP | 3719554 | 10/2020 |
| JP | 2016184132 | 10/2016 |
| TW | M533761 | 12/2016 |

OTHER PUBLICATIONS

CNIPA, Second Office Action for CN Application No. 202110252510.8, Mar. 22, 2022.
CNIPA, First Office Action for CN Application No. 202110252612.X, Oct. 13, 2021.
WIPO, International Search Report and Written Opinion for International Application No. PCT/CN2022/078429, Apr. 24, 2022.
WIPO, International Search Report and Written Opinion for International Application No. PCT/CN2022/072697, Apr. 13, 2022.
EPO, Extended European Search Report for EP Application No. 22766086.7, Sep. 13, 2024.
EPO, Extended European Search Report for EP Application No. 22766183.2, Jul. 8, 2024.

* cited by examiner

VOICE COIL MOTOR, CAMERA, AND ELECTRONIC DEVICE

CROSS-REFERENCE TO RELATED APPLICATION(S)

The application is a continuation of International Application No. PCT/CN2022/072697, filed Jan. 19, 2022, which claims priority to Chinese Patent Application No. 202110252510.8, filed Mar. 8, 2021, the entire disclosures of which are incorporated herein by reference.

TECHNICAL FIELD

The disclosure relates to the field of electric-control apparatuses, and in particular, to a voice coil motor, a camera provided with the voice coil motor, and an electronic device provided with the camera.

BACKGROUND

With the rapid development of the mobile phone industry and faster technology innovation, consumers have increasingly stringent requirements for camera functionality of mobile phones, which poses greater challenges to cameras. Currently, motors used in cameras of the mobile phones on the market generally include autofocus (AF) motors and optical image stabilization (OIS) motors. The OIS motors used in high-end mobile phones are further categorized into ball-type motors and shrapnel-suspended-wire type motor motors. The shrapnel-suspended-wire type motor has a liner force-balancing system of structural reaction forces and thus can be controlled by an open-loop linear current, while the ball-type motor has only reaction forces of static/kinetic friction forces of balls and thus a position of a carrier can be determined only by a closed-loop system of a magnetic induction element. Therefore, the shrapnel-suspended-wire type motor has a lower cost than the ball-type motor. Currently, shrapnel-suspended-wire type OIS motors with two-axis closed-loop control are most widely produced on the market. However, the less expensive shrapnel-suspended-wire type motor has a risk of suspended-wire breakage in terms of reliability.

SUMMARY

The disclosure aims to provide a voice coil motor with high-reliability, a camera provided with the voice coil motor, and an electronic device provided with the camera.

In order to solve the described technical problem, a voice coil motor is provided in the disclosure. The voice coil motor includes a frame, a magnetic member disposed at the frame, a coil assembly received in an inner cavity of the frame, a first resilient member, a planar coil, and a base. The magnetic member is disposed around the coil assembly. The planar coil is disposed on the base. The frame is disposed on the planar coil. The first resilient member includes a first connection ring connected to the coil assembly and a first positioning portion. The coil assembly is connected to the frame via the first positioning portion. The first positioning portion is configured to reset the coil assembly after movement of the coil assembly relative to the frame. A positioning mechanism is disposed between the frame and the base and configured to reset the frame after movement of the frame relative to the base.

A camera is further provided in the disclosure. The camera includes a voice coil motor and a lens module. The lens module is provided at the voice coil motor. The voice coil motor is configured to drive the lens module to move.

An electronic device is further provided in the disclosure. The electronic device includes a housing, a main board disposed inside the housing, and the camera. The camera is disposed inside the housing, and the camera is electrically connected to the main board.

BRIEF DESCRIPTION OF THE DRAWINGS

To describe technical solutions in implementations of the disclosure more clearly, the following briefly introduces the accompanying drawings required for describing the implementations. Apparently, the accompanying drawings in the following description only illustrate some implementations of the disclosure. Those of ordinary skill in the art may also obtain other drawings based on these accompanying drawings without creative efforts.

DETAILED DESCRIPTION

Figure 1:
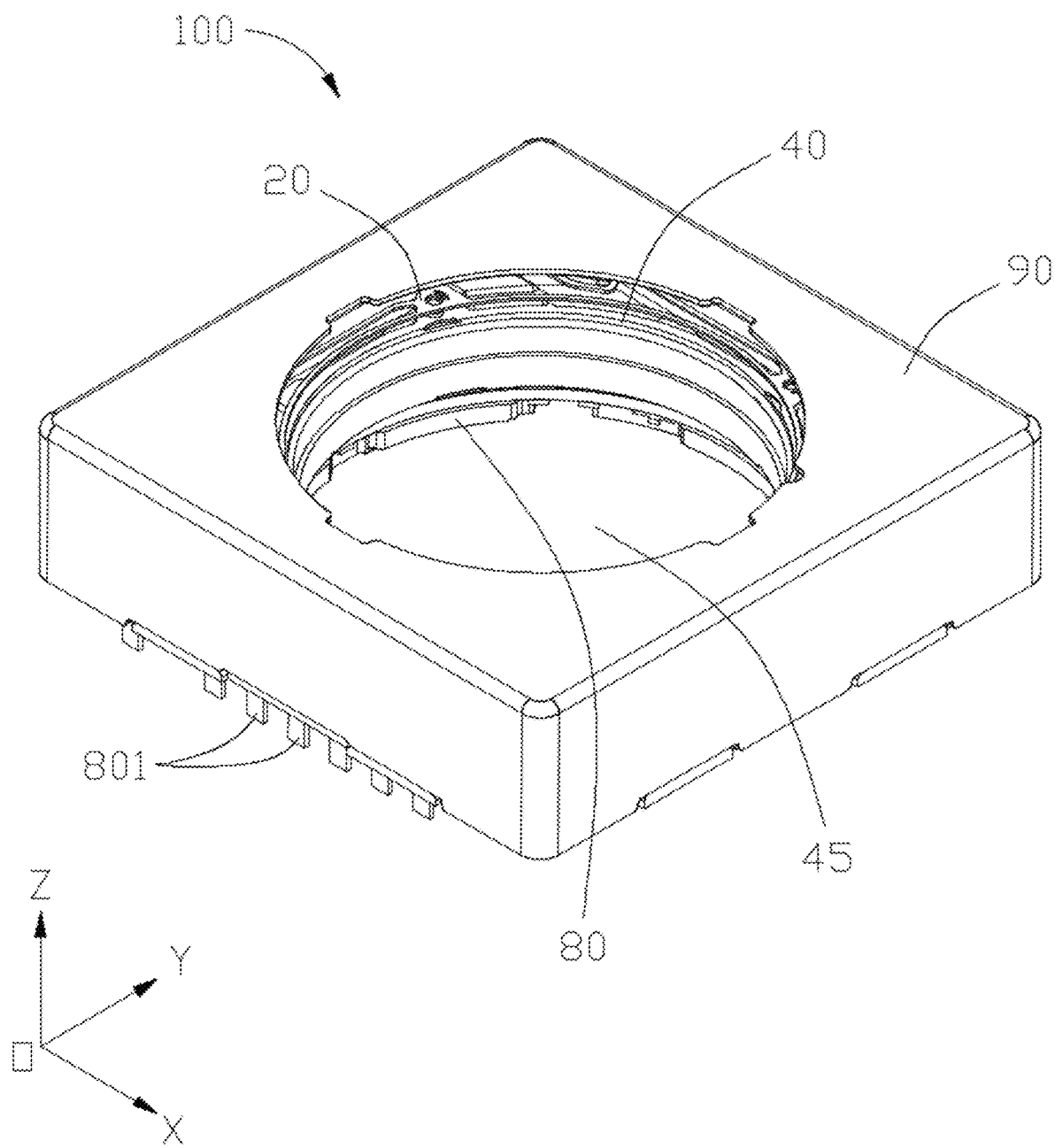
FIG. 1 is a schematic perspective structural view of a voice coil motor provided in an implementation of the disclosure.

A voice coil motor includes a frame, a magnetic member disposed at the frame, a coil assembly received in an inner cavity of the frame, a first resilient member, a planar coil, and a base. The magnetic member is disposed around the coil assembly. The planar coil is disposed on the base. The frame is disposed on the planar coil. The first resilient member includes a first connection ring connected to the coil assembly and a first positioning portion. The coil assembly is connected to the frame via the first positioning portion. The first positioning portion is configured to reset the coil assembly after movement of the coil assembly relative to the frame. A positioning mechanism is disposed between the frame and the base and configured to reset the frame after movement of the frame relative to the base.

The coil assembly includes a carrier and a coil wound around the carrier. The first connection ring includes a fixing portion connected to the carrier and a connection portion connected to the coil. The first positioning portion is connected to the fixing portion.

The first connection ring has an open-loop structure and further includes at least two connection branches. Each of the at least two connection branches extends in a circumferential direction of the first connection ring. The at least two connection branches defines the open-loop structure. Each of both ends of each of the at least two connection branches is provided with a fixing portion, and one of the both ends of each of the at least two connection branches is provided with the connection portion close to the fixing portion.

The first positioning portion includes a first branch connected to the fixing portion and a first positioning sheet disposed at one end of the first branch away from the fixing portion. The first branch is resilient. The first positioning sheet is connected to the frame.

The first branch includes an extension section extending in the circumferential direction of the first connection ring and a first branching section connected between the extension section and the first positioning sheet.

The first branching section extends in a radial direction of the first connection ring.

The positioning mechanism is a second positioning portion connected to the first positioning portion. The frame is connected to the base via the second positioning portion. The second positioning portion is configured to position the frame to the base.

A thickness of the first positioning portion is equal to a thickness of the second positioning portion, and the first positioning portion and the second positioning portion are on the same plane in an initial state.

The second positioning portion includes a second positioning sheet connected to the base and a second branch connected between the first positioning sheet and the second positioning sheet. The second branch has a pre-pressure for driving the frame to move towards the base. The second branch is further configured to reset the frame after movement of the frame.

The second branch includes a first resilient section connected to the first positioning sheet, a second resilient section connected to the first resilient section, a third resilient section connected to the second resilient section, and a fourth resilient section connected between the third resilient section and the second positioning sheet. The first resilient section, the second resilient section, and the third resilient section surround the first positioning sheet.

The base is provided with a connection block corresponding to the second positioning sheet. The second positioning sheet is fixedly connected to the connection block. The second positioning sheet is closer to the base than the first positioning sheet.

The first connection ring has a closed-loop structure. The first connection ring includes a connection branch that is annular and fixing portions arranged around the connection branch. The first positioning portion is connected to the fixing portions.

The positioning mechanism includes a magnetic attraction member disposed at the base. The magnetic member and the magnetic attraction member cooperate to position the frame to the base.

The voice coil motor further includes a sliding pad disposed between the planar coil and the frame and/or between the planar coil and the magnetic member. The frame and the magnetic member are slidably disposed on the planar coil via the sliding pad.

The sliding pad is fixedly connected to the planar coil, and the magnetic member on the frame is in contact with and slidable on the sliding pad.

The base is provided with a magnetic induction element. The planar coil defines an accommodation groove corresponding to the magnetic induction element, the magnetic induction element is accommodated in the accommodation groove, so that the magnetic induction element corresponds to the magnetic member, and the magnetic induction element is configured to determine a position of the frame.

The base is provided with a positioning post. The planar coil defines a slot corresponding to the positioning post, and the positioning post is snapped into the slot to position the planar coil to the base.

The base is provided with a magnetic attraction member corresponding to the magnetic member, and the magnetic member and the magnetic attraction member cooperate to position the frame to the base.

A camera includes the voice coil motor and a lens module. The lens module is disposed at the voice coil motor, and the voice coil motor is configured to drive the lens module to move.

An electronic device includes a housing, a main board disposed inside the housing, and the camera. The camera is disposed inside the housing, and the camera is electrically connected to the main board.

The following clearly and completely describes the technical solutions in the implementations of the disclosure with reference to the accompanying drawings in the implementations of the disclosure. Apparently, the described implementations are merely part rather than all of the implementations of the disclosure. The implementations described herein can be combined with each other appropriately. All other implementations obtained by those of ordinary skill in the art based on the implementations of the disclosure without creative efforts shall fall within the protection scope of the disclosure.

In addition, the following illustrations of various implementations are provided with reference to the accompanying drawings to illustrate specific implementations that can be implemented in the disclosure. Directional terms such as "up", "down", "front", "back", "left", "right", "inside", "outside", "side", and the like referred to herein which are only for directions with reference to the accompanying drawings. Therefore, the directional terms used herein are intended to better and more clearly illustrate and understand the disclosure, rather than explicitly or implicitly indicate that devices or elements referred to herein must have a certain direction or be configured or operated in a certain direction and therefore cannot be understood as limitation on the disclosure.

It is noted that, in the illustrations of the disclosure, terms "mount", "couple", "connect", "interconnect", and "disposed" should be understood in a broad sense unless otherwise expressly specified and limited. For example, the terms "mount", "couple", "connect", "interconnect", and "disposed" may refer to fixedly connect, detachably connect, or integrally connect, may refer to mechanically connect, and may refer to a directly connect, indirectly connect through an intermediate medium, or an intercommunicate interiors of two elements. For those of ordinary skill in the art, the specific meanings of the above terms in the disclosure can be understood according to specific situations.

Figure 2:
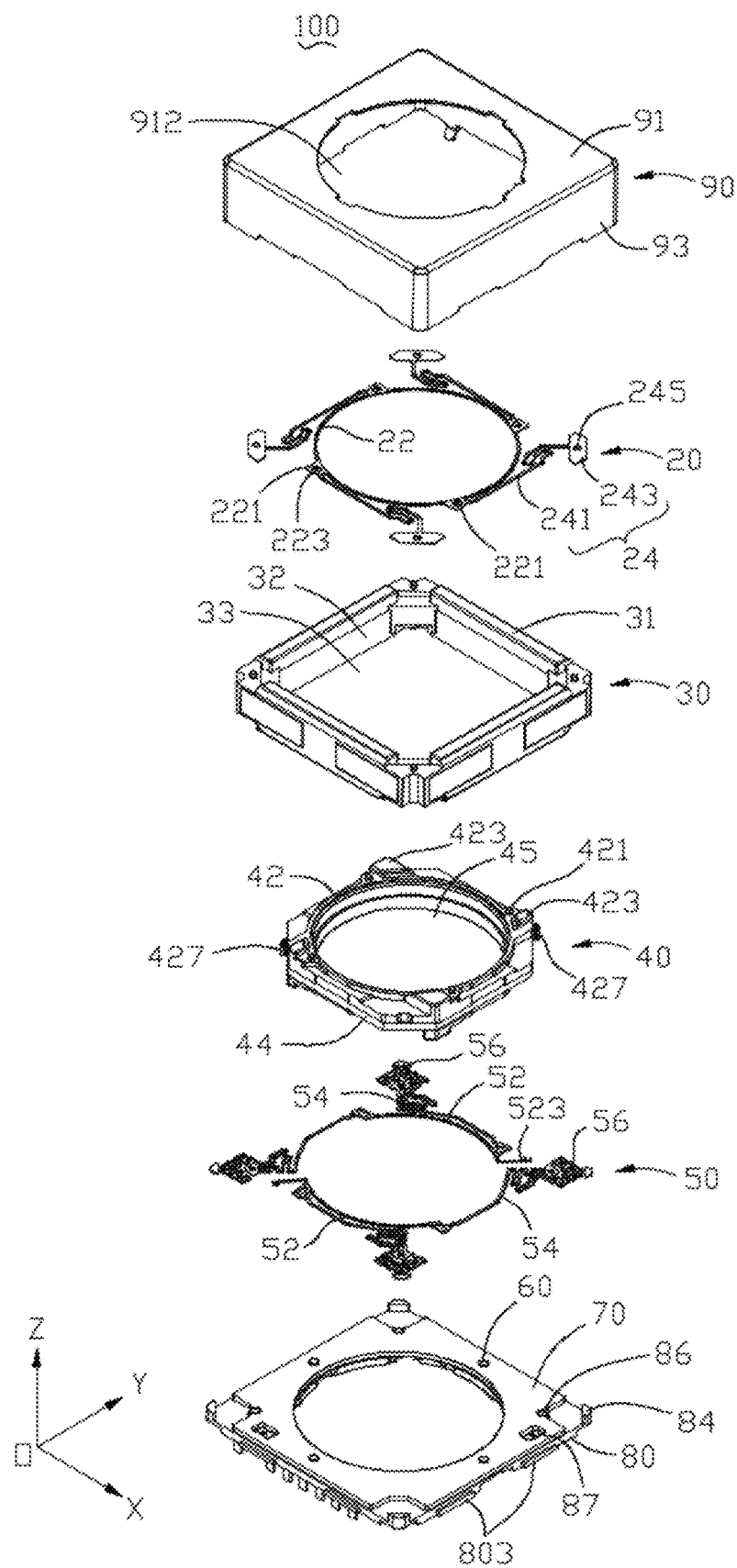
FIG. 2 is a schematic exploded perspective structural view of the voice coil motor in FIG. 1.
Figure 3:
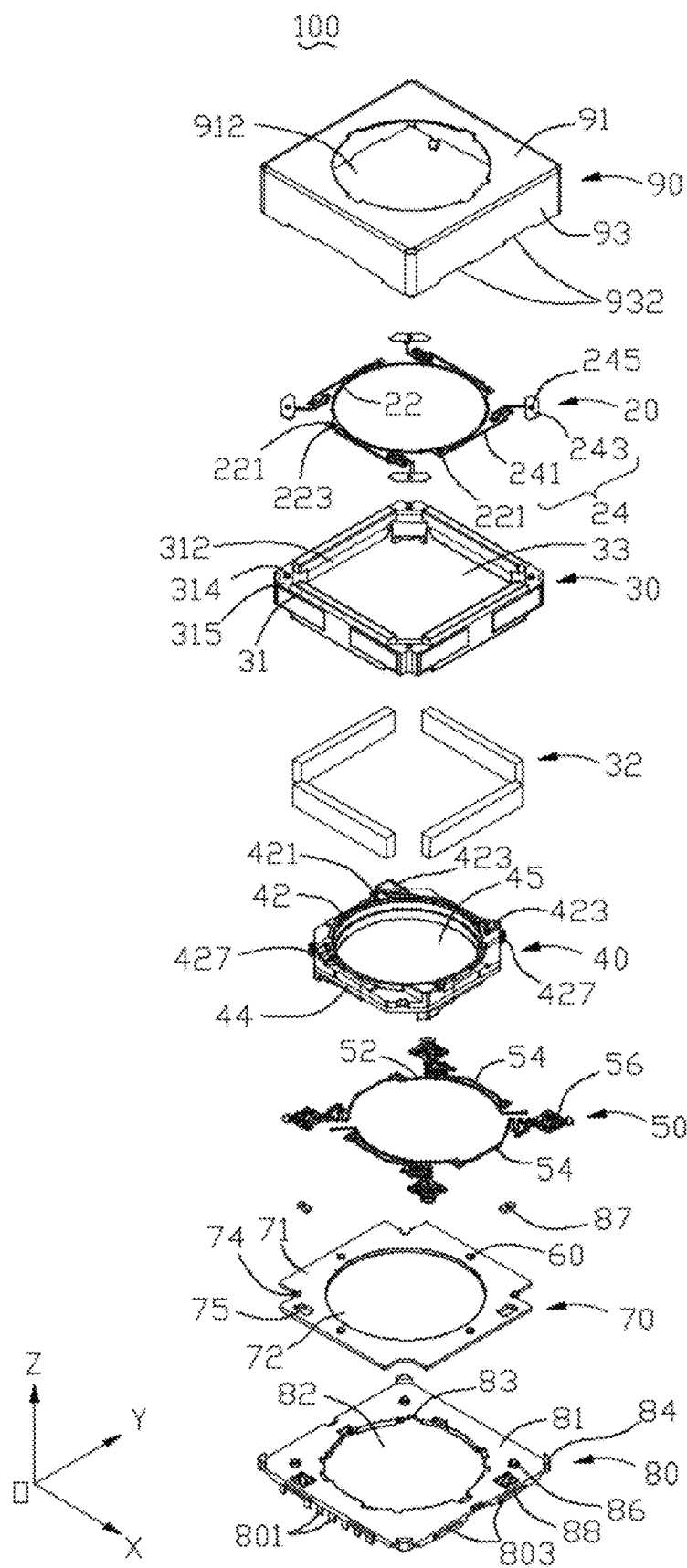
FIG. 3 is a further schematic exploded perspective structural view of the voice coil motor in FIG. 2.
Figure 4:
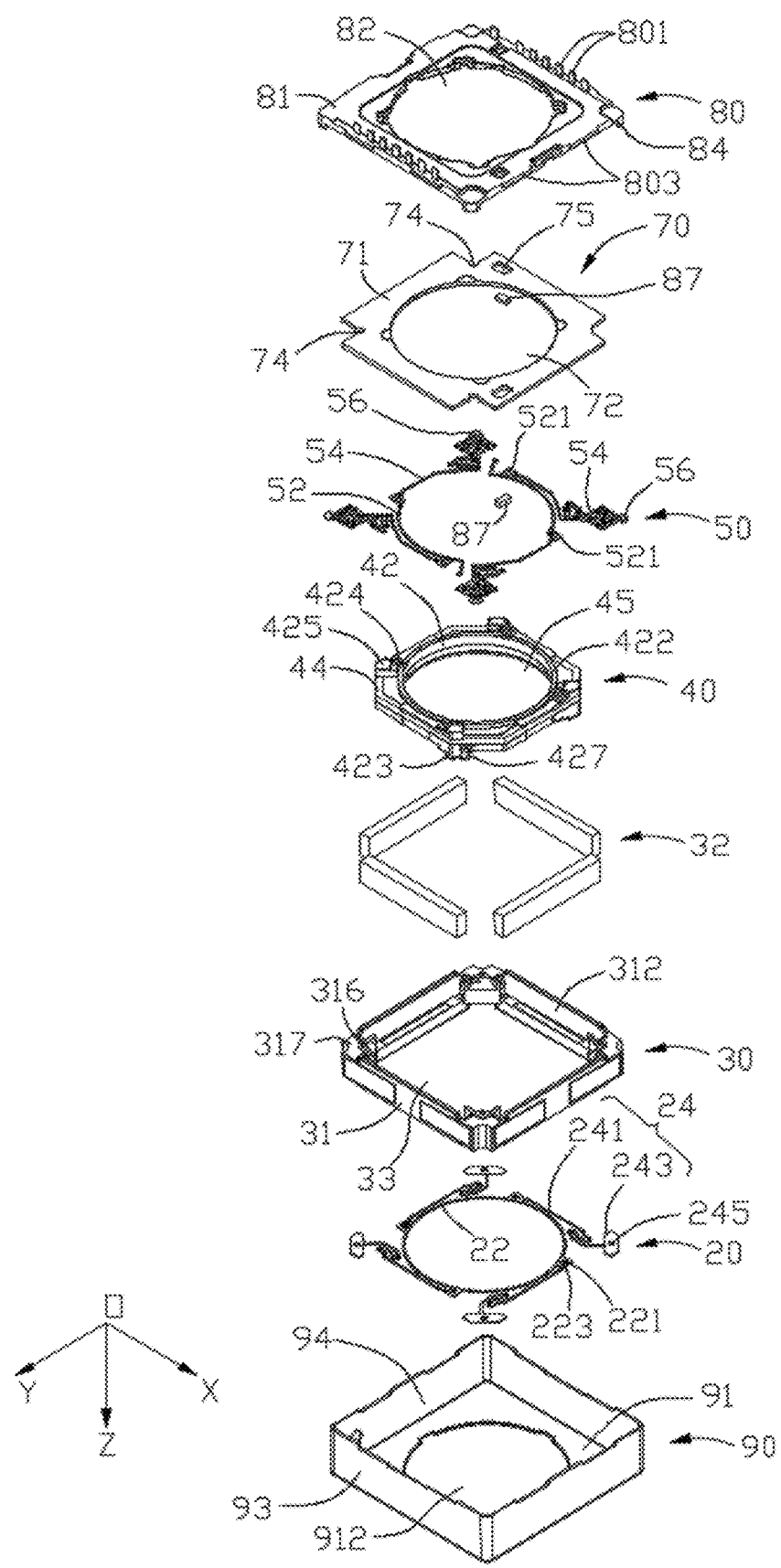
FIG. 4 is a schematic perspective structural view of the voice coil motor in FIG. 3, viewed from another direction.
Figure 5:
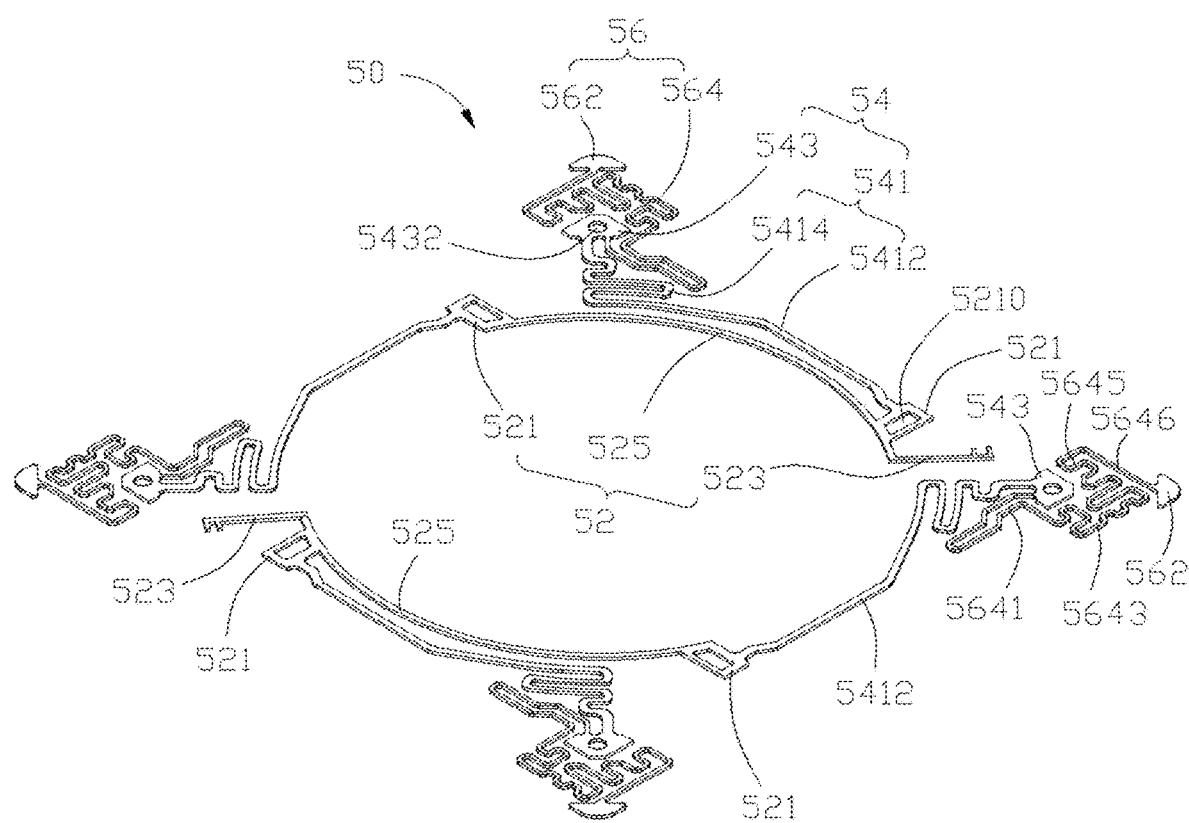
FIG. 5 is a schematic enlarged perspective structural view of a first resilient member in FIG. 2.
Figure 6:
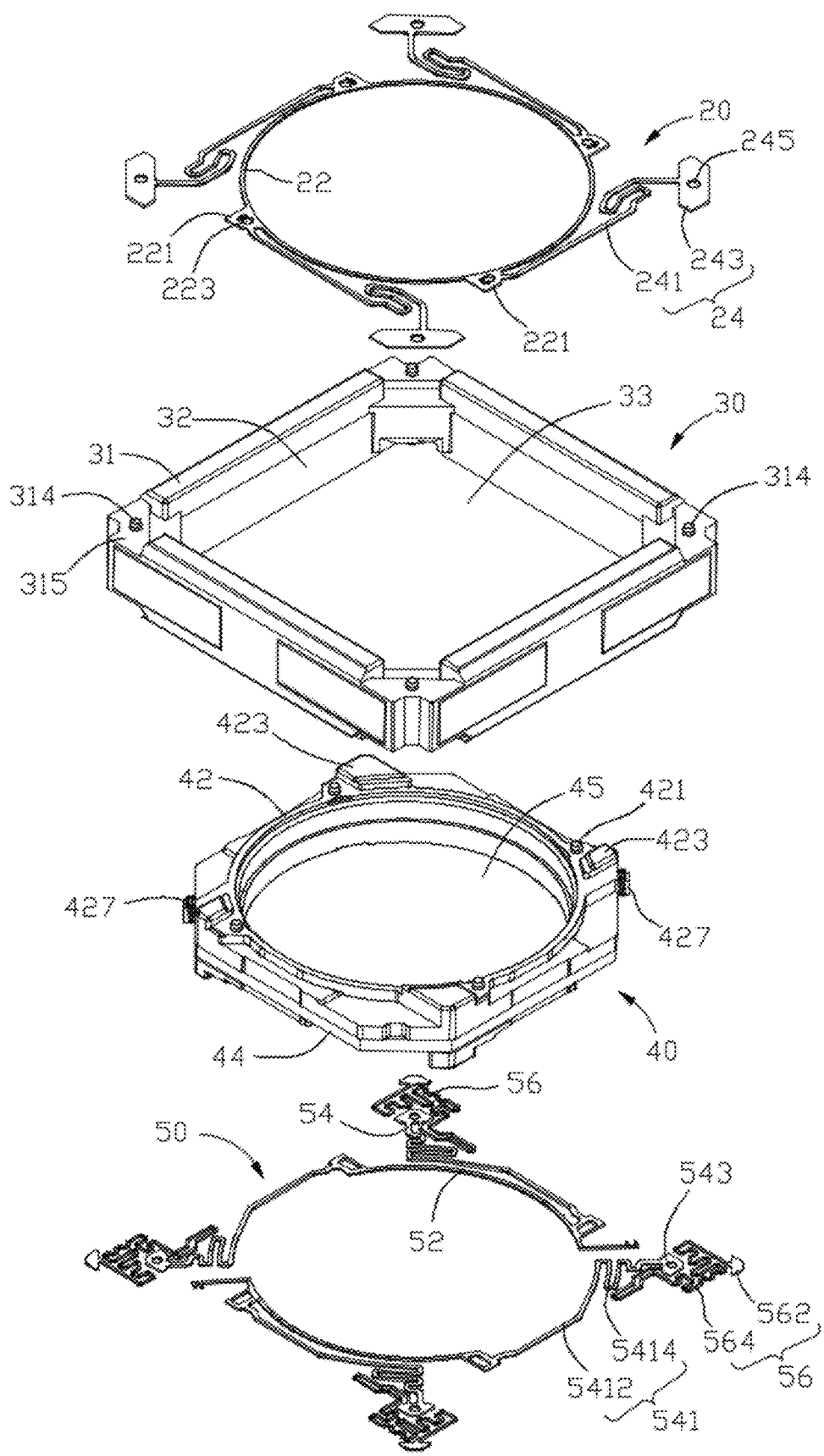
FIG. 6 is a schematic perspective structural view of an autofocus mechanism in FIG. 2.
Figure 7:
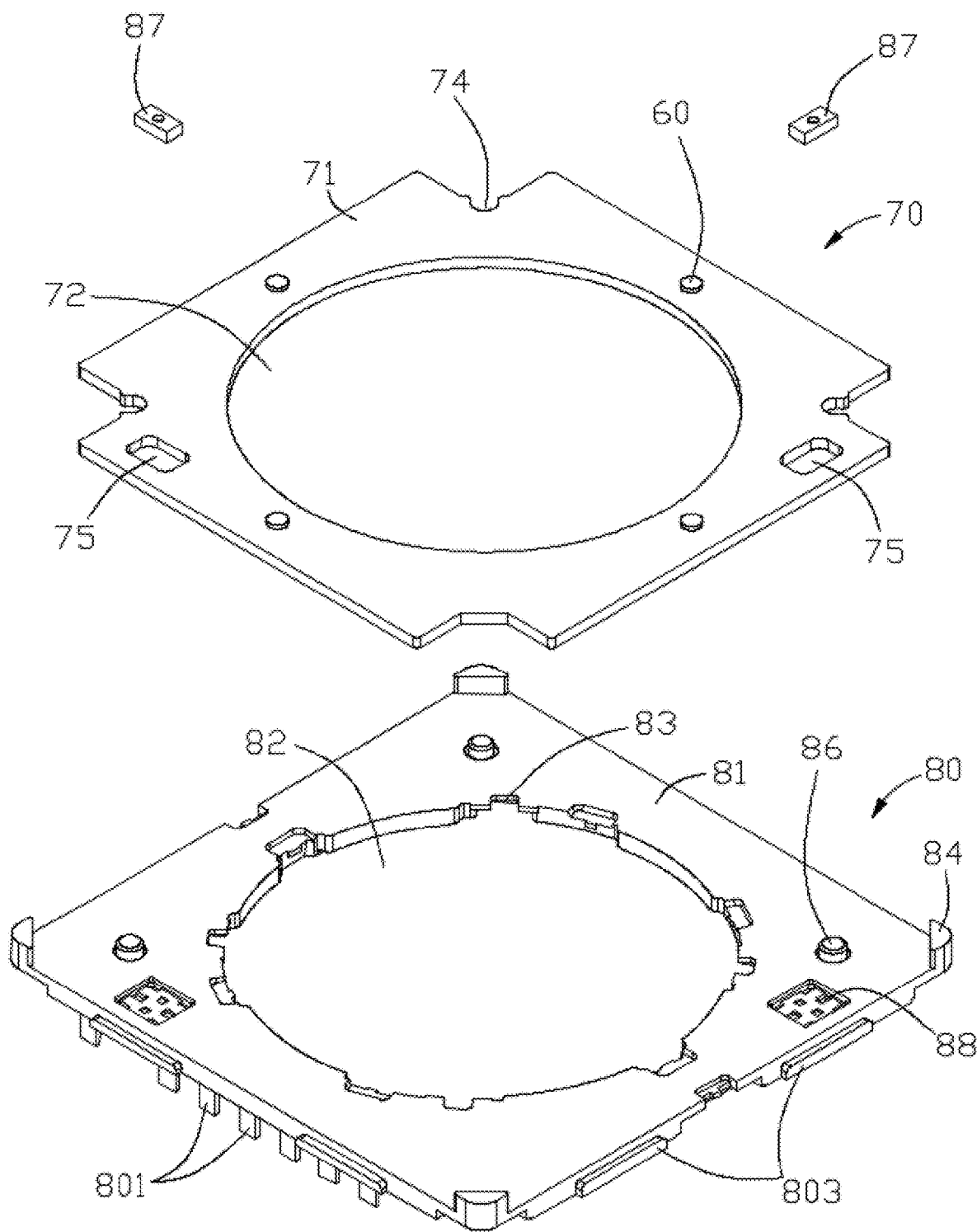
FIG. 7 is a schematic exploded perspective structural view of an optical image stabilization (OIS) mechanism in FIG. 2.
Figure 8:
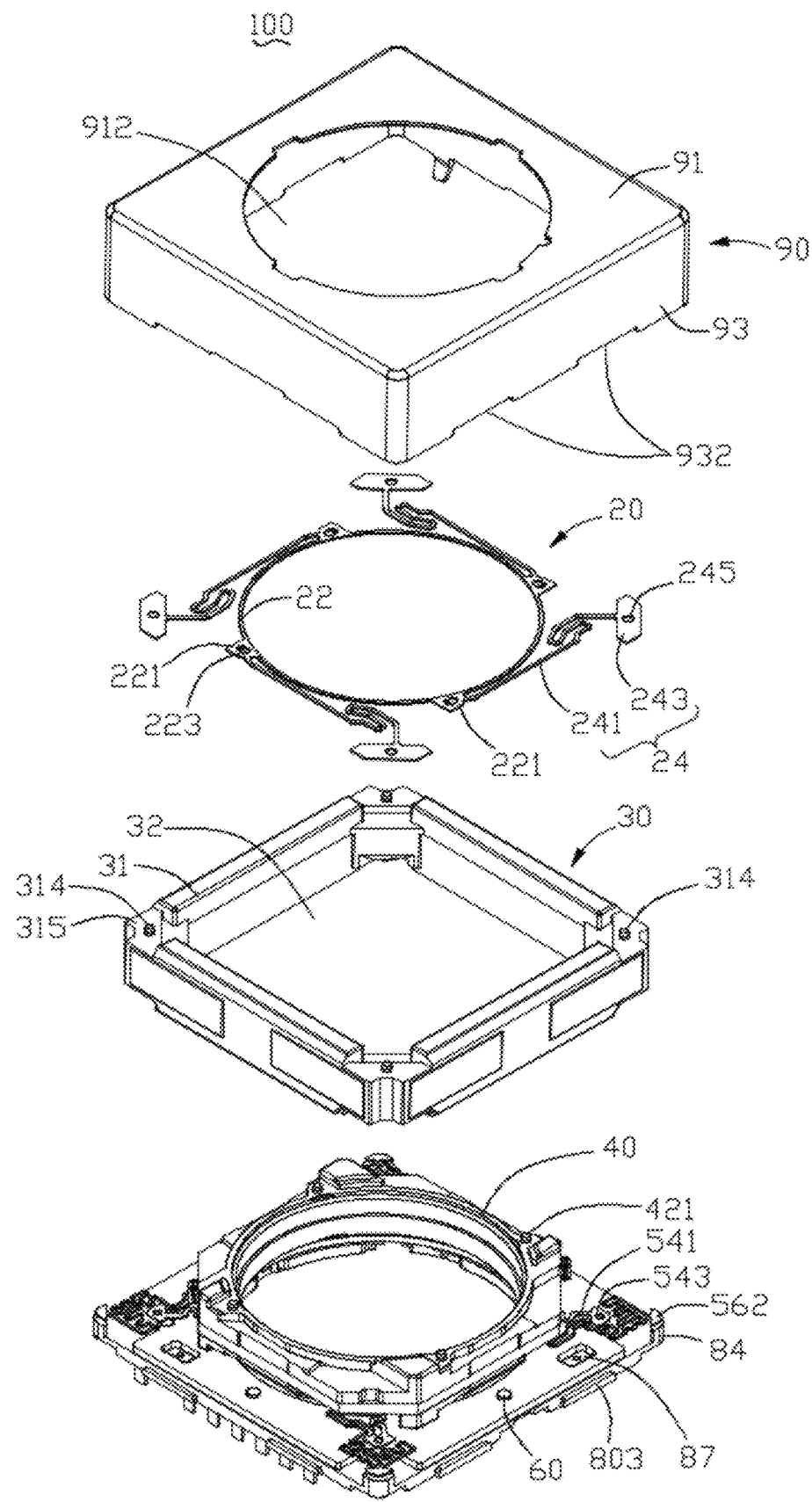
FIG. 8 is a schematic partial perspective structural assembly view of the voice coil motor in FIG. 3.
Figure 9:
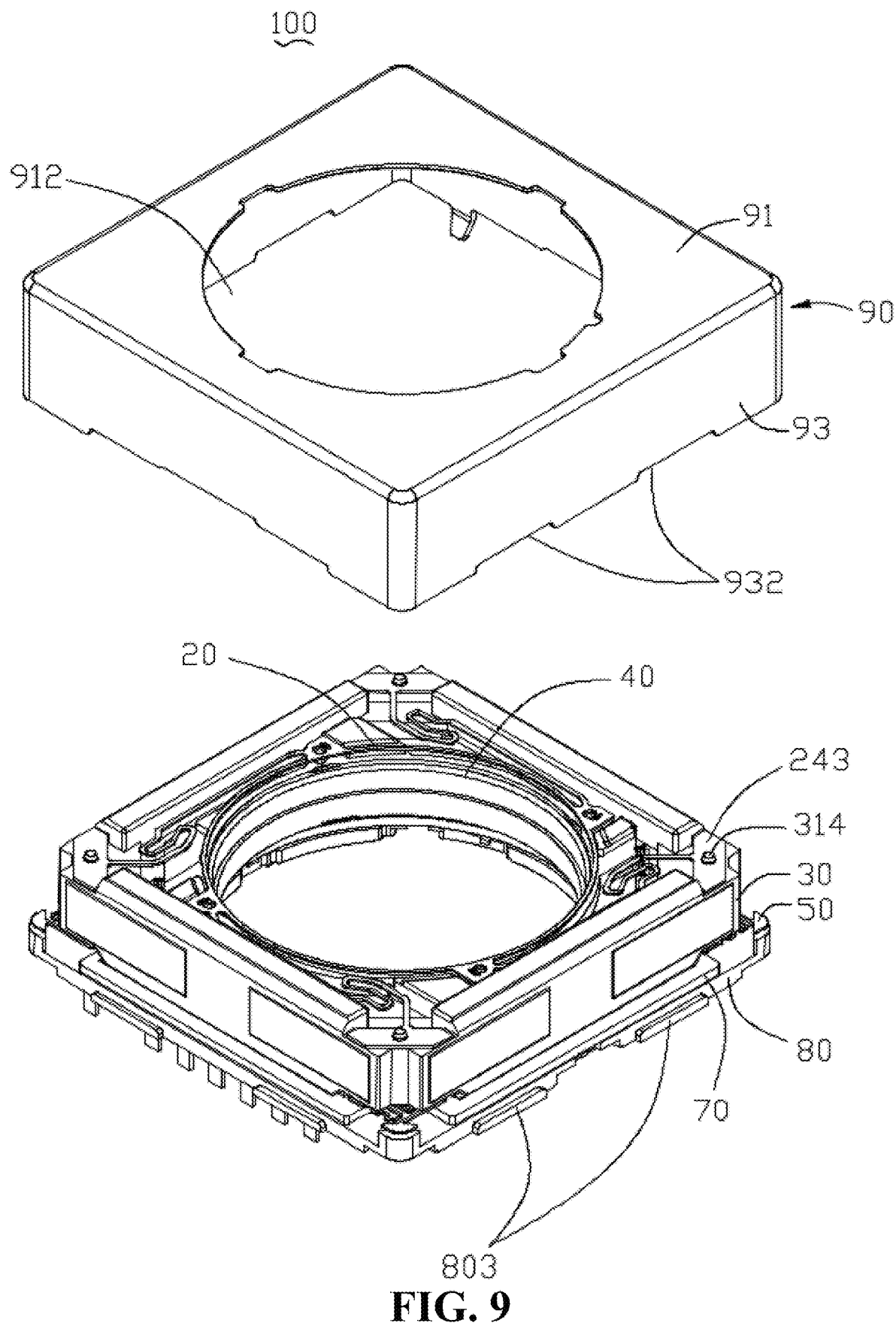
FIG. 9 is a further schematic assembly view of the voice coil motor in FIG. 8.
Figure 10:
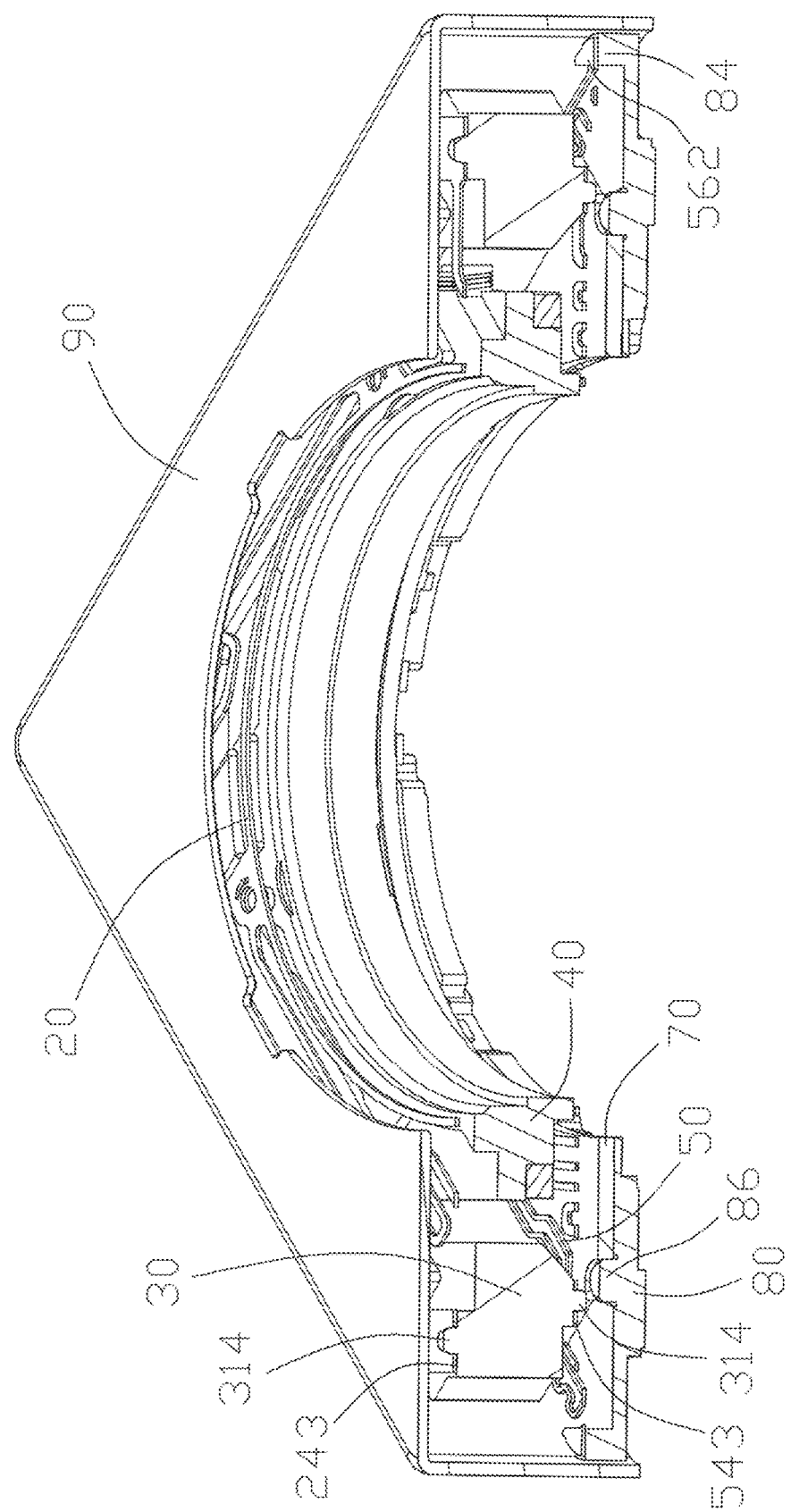
FIG. 10 is a perspective cross-sectional view of the voice coil motor in FIG. 1, viewed from a direction.
Figure 11:
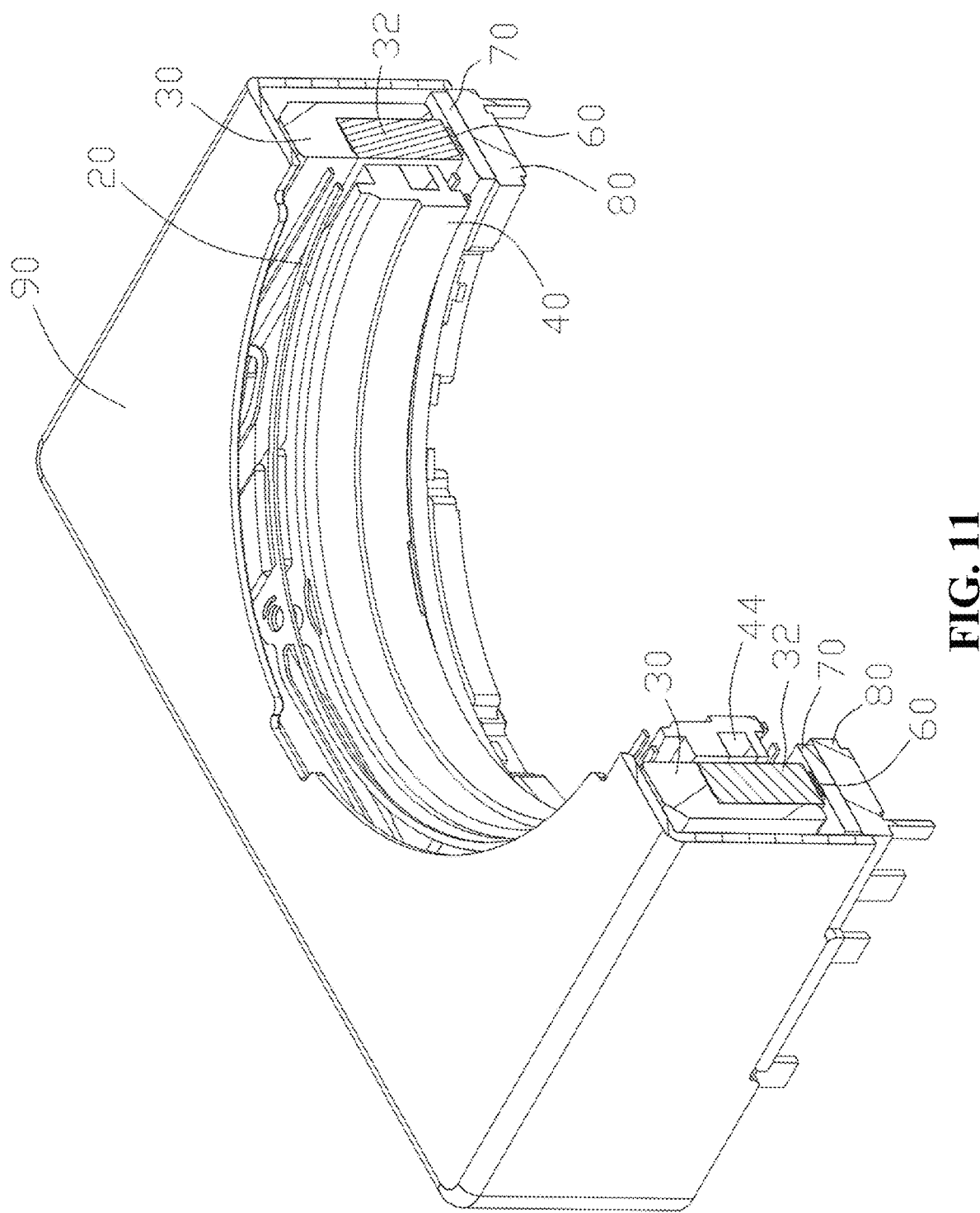
FIG. 11 is a perspective cross-sectional view of the voice coil motor in FIG. 1, viewed from another direction.

Referring to FIGS. 1 to 5, FIG. 1 is a schematic perspective structural view of a voice coil motor 100 provided in an implementation of the disclosure, FIG. 2 is a schematic exploded perspective structural view of the voice coil motor 100 in FIG. 1, FIG. 3 is a further schematic exploded perspective structural view of the voice coil motor 100 in FIG. 2, FIG. 4 is a schematic perspective structural view of the voice coil motor 100 in FIG. 3, viewed from another direction, and FIG. 5 is an enlarged view of a first resilient member 50 in FIG. 2. The voice coil motor 100 provided in an implementation of the disclosure includes an autofocus mechanism and an optical image stabilization (OIS) mechanism. The autofocus mechanism includes the first resilient member 50, a second resilient member 20, a frame 30, a magnetic member 32 disposed at the frame 30, and a coil assembly 40 movably disposed in an inner cavity of the frame 30. The magnetic member 32 is fixedly connected to the frame 30 and surrounds the coil assembly 40. The first resilient member 50 and the second resilient member 20 are disposed on a front face and a back face of the coil assembly 40, respectively. The first resilient member 50 is connected to the coil assembly 40, and the second resilient member 20 is connected to the frame 30. The OIS mechanism includes a sliding pad 60, a planar coil 70, and a base 80. The sliding pad 60 is disposed on the planar coil 70. The planar coil 70 is disposed on the base 80. The frame 30 is disposed on the planar coil 70. The sliding pad 60 is sandwiched between the frame 30 and the planar coil 70. A circuit board is disposed in the base 80. The circuit board is electrically connected to the planar coil 70, and is provided with a drive chip, an output interface, and the like. The first resilient member 50 is disposed at the coil assembly 40 and disposed between the frame 30 and the base 80. The first resilient member 50 includes a first connection ring 52 connected to the coil assembly 40 and a first positioning portion 54 connected to the first connection ring 52. The coil assembly 40 is connected to the frame 30 via the first positioning portion 54. The first positioning portion 54 is configured to reset the coil assembly 40 after movement of the coil assembly 40 relative to the frame 30. A positioning mechanism is disposed between the frame 30 and the coil assembly 40 and configured to reset the frame 30 after movement of the frame 30 relative to the base 80. In the implementations, the first resilient member 50 further includes a second positioning portion 56 connected to the first positioning portion 54. The positioning mechanism is the second positioning portion 56 disposed between the frame 30 and the base 80. That is, the frame 30 is connected to the base 80 via the second positioning portion 56, and the second positioning portion 56 is configured to reset the frame 30 after movement of the frame 30 relative to the base 80.

During operation of the voice coil motor 100, the coil assembly 40 is energized so that a first electromagnetic force is generated between the coil assembly 40 and the magnetic member 32 to drive the coil assembly 40 attached with a lens to move in an axial direction, achieving an autofocus function; the planar coil 70 is energized so that a second electromagnetic force is generated between the planar coil 70 and the magnetic member 32 to drive the frame 30 and the coil assembly 40 attached with the lens to move in the voice coil motor 100 along a XOY plane, compensating lens shaking and thus achieving OIS function. The axial direction refers to a direction parallel to an axis of the lens, that is, the axial direction is a Z-axis direction illustrated in FIGS. 1 to 3.

The voice coil motor 100 provided in the disclosure includes the first resilient member 50, and the first connection ring 52 of the first resilient member 50 is connected to the coil assembly 40. The first positioning portion 54 is connected between the frame 30 and the coil assembly 40. The first positioning portion 54 is configured to reset the coil assembly 40 after movement of the coil assembly 40 relative to the frame 30. The second positioning portion 56 is connected between the frame 30 and the base 80. The second positioning portion 56 is configured to reset the frame 30 and the coil assembly 40 after movement of the frame 30 and the coil assembly 40 relative to the base 80. Because the first resilient member 50 is firmly connected to the coil assembly 40, the frame 30, and the base 80, the reliability is high, and compared with a suspended-wire type motor in the related art, a risk of suspended-wire breakage can be avoided.

Figure 16:
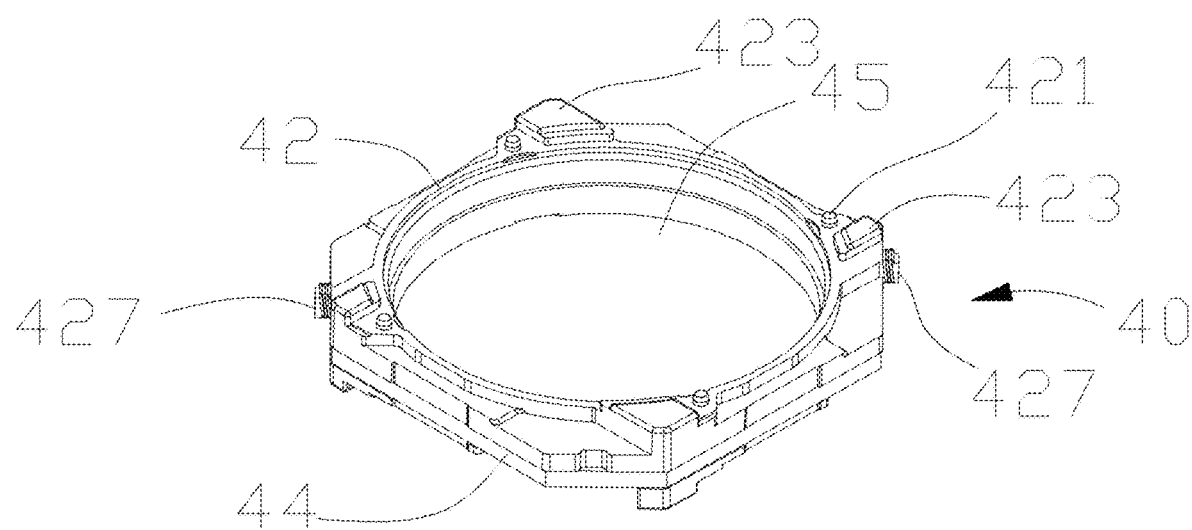
FIG. 16 is a schematic perspective structural view of a coil assembly provided in an implementation of the disclosure.
Figure 17:
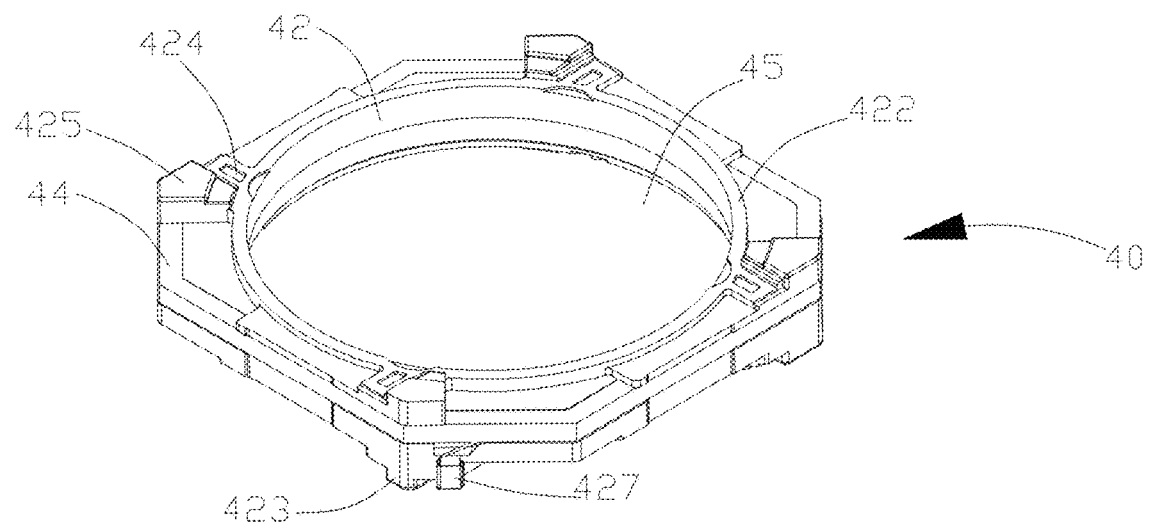
FIG. 17 is a schematic perspective structural view of the coil assembly in FIG. 16, viewed from another direction.

The coil assembly 40 includes a carrier 42 and a coil 44 wound around the carrier 42. The carrier 42 is a wire frame, and the wire frame is fixed to the coil 44 in an integrated winding manner. Referring to FIG. 16 and FIG. 17, the carrier 42 defines a mounting hole 45 that axially extends through a front face and a back face of the carrier 42. The mounting hole 45 is used for connection of the lens. The front face of the carrier 42 refers to a face of the carrier 42 facing the same direction as a light-incident hole of the lens, and the back face of the carrier 42 refers to a face of the carrier 42 facing away from the light-incident hole of the lens. The carrier 42 is provided with multiple positioning posts 421 and multiple first impact bosses 423 on the front face of the carrier 42. A length of the positioning posts 421 in the axial direction is less than a length of the first impact boss 423 in the axial direction. The positioning posts 421 are used for connection of the second resilient member 20. The first impact bosses 423 are used for preventing the lens attached to the carrier 42 from being directly impacted, thereby protecting the lens. A positioning ring 422 is disposed on the back face of the carrier 42 and surrounds the mounting hole 45. The carrier 42 defines multiple connection grooves 424 and is provided with multiple second impact bosses 425, and the multiple connection grooves 424 and the multiple second impact bosses 425 are on the back face of the carrier 42 and arranged around the positioning ring 422. The connection grooves 424 is used for connection of the first resilient member 50. The second impact bosses 425 are used for preventing the lens attached to the carrier 42 from being directly impacted, thereby protecting the lens. The carrier 42 is provided with two coil-connection ends 427 at an outer periphery of the carrier 42. The first connection ring 52 of the first resilient member 50 is electrically connected to the coil-connection ends 427. In the implementations, the carrier 42 is provided with four positioning posts 421 and four first impact bosses 423 on the front face of the carrier 42, the four positioning posts 421 are evenly arranged at intervals in a circumferential direction of the carrier 42, and the four first impact bosses 423 are arranged in a circle in the circumferential direction of the carrier 42. The carrier 42 is provided with four connection grooves 424 and four second impact bosses 425 on the back face of the carrier 42. The four connection grooves 424 are evenly arranged at intervals in the circumferential direction of the carrier 42, and the four second impact bosses 425 are arranged in a circle in the circumferential direction of the carrier 42. The four second impact bosses 425 respectively correspond to the four first impact bosses 423 in the axial direction.

Referring to FIGS. 2 to 4 and FIG. 6, FIG. 6 is a schematic perspective structural view of the autofocus mechanism in FIG. 2. The second resilient member 20 is a resilient sheet. The resilient sheet includes a second connection ring 22 surrounding the coil assembly 40 and multiple positioning portions 24 connected to an outer periphery of the second connection ring 22. Each positioning portion 24 is connected between the frame 30 and the carrier 42. Specifically, the second connection ring 22 is a closed-ring formed by a thin strip. Multiple fixing portions 221 are disposed at the outer periphery of the second connection ring 22. The multiple positioning portions 24 are connected to the multiple fixing portions 221, respectively. In the implementations, an inner diameter of the second connection ring 22 is slightly larger than a diameter of the mounting hole 45 of the carrier 42, and an outer diameter of the second connection ring 22 is smaller than an outer diameter of the carrier 42. The multiple fixing portions 221 are implemented as four fixing portions 221 evenly arranged at intervals in a circumferential direction of the second connection ring 22. The multiple positioning portions 24 are implemented as four positioning portions 24, and the four positioning portions 24 are respectively connected to the four fixing sections 221 and evenly arranged at intervals in the circumferential direction of the second connection ring 22. Each fixing portion 221 is a lug connected to the second connection ring 22. Each fixing portion 221 defines a fixing hole 223 extending axially. The positioning portion 24 includes a connection branch 241 that is resilient and connected to the fixing section 221, and a positioning sheet 243 disposed at an end of the connection branch 241 away from the fixing section 221. The positioning sheet 243 is connected to the frame 30. The connection branch 241 is in a curve shape at a position close to the positioning sheet 243. The positioning sheet 243 defines a positioning hole 245 extending axially.

Figure 18:
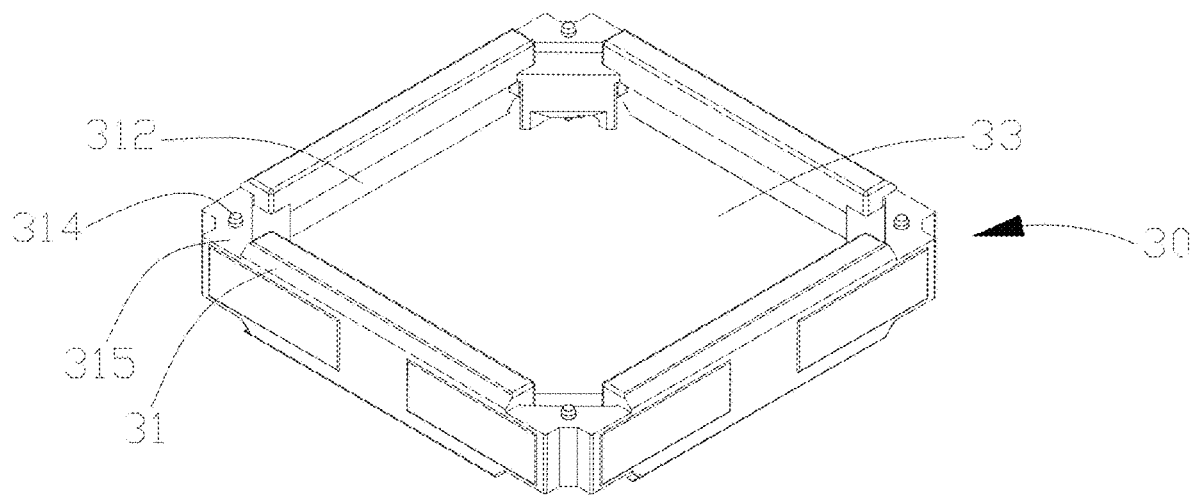
FIG. 18 is a schematic perspective structural view of a frame provided in an implementation of the disclosure.
Figure 19:
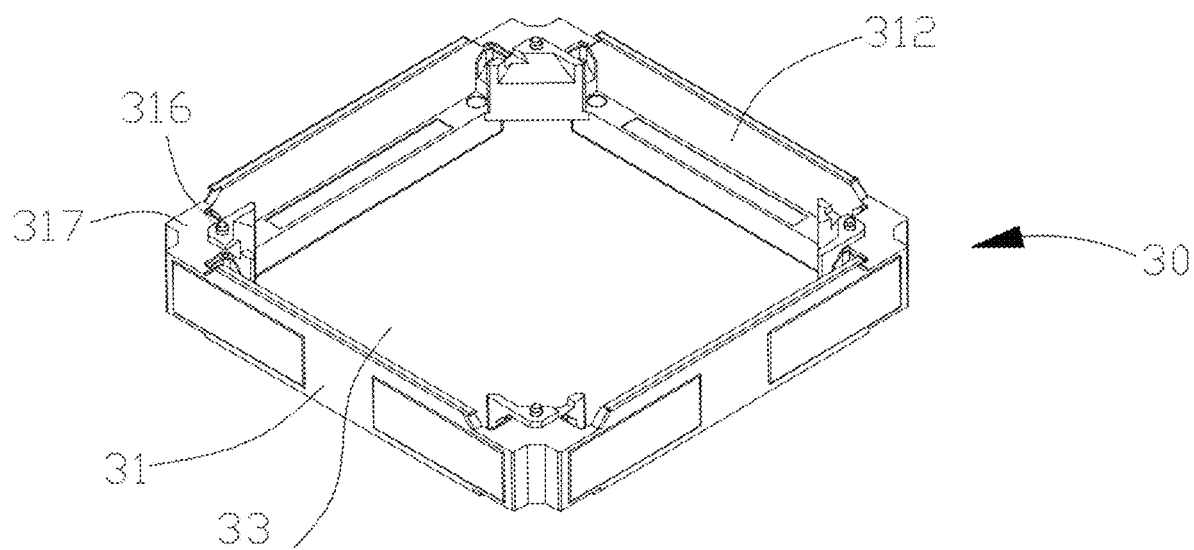
FIG. 19 is a schematic perspective structural view of the frame in FIG. 18, viewed from another direction.

Referring to FIG. 18 and FIG. 19, the frame 30 includes multiple side walls 31. The side walls 31 are connected end to end to surround a space to define an accommodation space 33. The accommodation space 33 is used for accommodating the coil assembly 40. The multiple magnetic members 32 are disposed on an inner periphery of the frame 30, so that the multiple magnetic members 32 are arranged in a circle in a circumferential direction of the coil 44. An inner side face of each side wall 31 defines a positioning groove 312, and the magnetic member 32 is fixedly connected in the positioning groove 312. Specifically, the magnetic member 32 may be connected to the frame 30 by adhesive bonding, snap-fitting, or thermal fusion. In the implementations, the frame 30 is rectangular and includes four side walls 31. The four side walls 31 are connected end to end to surround a space to define the rectangular accommodation space 33. The inner side face of each side wall 31 defines the rectangular positioning groove 312. The multiple magnetic members 32 are four elongated magnetic bodies fixedly connected to the four positioning grooves 312 of the side walls 31, respectively, so that the four magnetic bodies surround the accommodation space 33.

The frame 30 is provided with multiple connection posts 314 on a front face of the frame 30, and the multiple connection posts 314 are connected to the positioning sheets 243 of the second resilient member 20. In the implementations, a first avoidance groove 315 is defined on a front face of an intersection of each two adjacent side walls 31, the connection post 314 protrudes from a bottom face of the first avoidance groove 315, and the first avoidance groove 315 is in communication with the accommodation space 33 of the frame 30. In some implementation, a length of the connection post 314 is smaller than a depth of a corresponding first avoidance groove 315, so that a front face of the second resilient member 20 connected to the frame 30 does not exceed the front face of the frame 30, thereby reducing an overall thickness of the voice coil motor 100. The frame 30 is provided with multiple fixing posts 316 on a back face of the frame 30, and the fixing posts 316 are connected to the first positioning portions 54 of the first resilient member 50. In the implementations, a second avoidance groove 317 is formed on a back face of the intersection of each two adjacent side walls 31, the fixing post 316 protrudes from a bottom face of the second avoidance groove 317, and the second avoidance groove 317 is in communication with the accommodation space 33 of the frame 30. In some implementation, a length of the fixing post 316 is less than a depth of a corresponding second avoidance groove 317, so that a back face of the first resilient member 50 connected to the frame 30 does not exceed the back face of the frame 30, thereby reducing the overall thickness of the voice coil motor 100.

Referring to FIGS. 2 to 5, the first connection ring 52 includes a fixing portion 521 connected to the carrier 42 and a connection portion 523 connected to the coil-connection end 427. The fixing portion 521 is configured to fix the first connection ring 52 to the carrier 42, the fixing portion 521 is further connected to the first positioning portion 54, and the connection portion 523 is configured to be electrically connected to the coil 44. In the implementations, the first connection ring 52 has an open-loop structure, that is, the first connection ring 52 is not a closed-ring structure. Specifically, the first connection ring 52 further includes at least two connection branches 525, each connection branch 525 is in an arc-shape and extends in a circumferential direction of the first connection ring 52, and the at least two connection branches 525 form a ring with a gap. Each of both ends of each connection branch 525 is provided with a fixing portion 521, and the fixing portion 521 is connected to the first positioning portion 54, so that the connection branch 525 can be uniformly stressed. One of both ends of each connection branch 525 is provided with the connection portion 523 close to a corresponding fixing portion 521. In some implementation, the fixing portion 521 is a lug protruding from an outer periphery of the connection branch 525, and the lug defines a through hole 5210. One end of the connection portion 523 away from the connection branch 525 is provided with a connection branch connected to the coil-connection end 427 of the carrier 42.

The first positioning portion 54 includes a first branch 541 connected to the fixing portion 521 and a first positioning sheet 543 disposed at one end of the first branch 541 away from the fixing portion 521, the first branch 541 is resilient, and the first positioning sheet 543 is connected to the frame 30. In some implementation, the first positioning sheet 543 defines a connection hole 5432. The first branch 541 is made of a resilient material, that is, the first branch 541 is configured to reset the coil assembly 40 after the coil assembly 40 moves relative to the frame 30. Specifically, when the coil 44 is energized, the first electromagnetic force is generated between the coil 44 and the magnetic member 32, the first electromagnetic force drives the coil assembly 40 to move in the axial direction, and the first branch 541 resets the coil assembly 40 after the coil assembly 40 moves relative to the frame 30, so that an autofocus function of the lens attached to the coil assembly 40 can be achieved. In the implementations, the first positioning portions 54 is implemented as four first positioning portions 54, and the four first positioning portions 54 are connected to the four fixing portions 521 of the first connection ring 52, respectively. The four first positioning portions 54 are arranged at intervals in the circumferential direction of the first connection ring 52, and the first positioning sheet 543 of each first positioning portion 54 is connected to the frame 30. Specifically, the first branch 541 includes an extension section 5412 extending in the circumferential direction of the first connection ring 52 and a first branching section 5414 connected between the extension section 5412 and the first positioning sheet 543, and the first branching section 5414 extends in a radial direction of the first connection ring 52. In some implementation, the first branching section 5414 curves in a wave shape.

In the implementations, a thickness of the first connection ring 52 is equal to a thickness of the first positioning portion 54, that is, in an initial state, the first connection ring 52 and the first positioning portion 54 are on the same plane.

The second positioning portion 56 is connected between the first positioning portion 54 and the base 80, and the second positioning portion 56 is configured to position the frame 30 to the base 80. Specifically, the second positioning portion 56 is connected between the first positioning sheet 543 and the base 80. In the implementations, the second positioning portion 56 includes a second positioning sheet 562 connected to the base 80 and a second branch 564 connected between the first positioning sheet 543 and the second positioning sheet 562. The second branch 564 is made of a resilient material so that the second branch 564 has a pre-pressure that can drive the frame 30 to move towards the base 80, and the second branch 546 is further configured to reset the frame 30 after the frame 30 moves. In some implementation, the first positioning sheet 543 and a corresponding second positioning sheet 562 are arranged in the radial direction of the first connection ring 52, and the second positioning sheet 562 is farther away from the first connection ring 52 than the first positioning sheet 562.

The second branch 564 bends from the first positioning sheet 543 toward a Y-direction and a X-direction to be connected to the second positioning sheet 562. Specifically, the second branch 564 includes a first resilient section 5641 connected to the first positioning sheet 543, a second resilient section 5643 connected to the first resilient section 5641, and a third resilient section 5645 connected to the second resilient section 5643, and a fourth resilient section 5646 connected between the third resilient section 5645 and the second positioning sheet 562. The first resilient section 5641, the second resilient section 5643, and the third resilient section 5645 surround the first positioning sheet 543. Specifically, the first resilient section 5641 first bends from a side of the first positioning sheet 543 facing the first branch 541 towards the extension section 5412, and then further bends towards the first positioning sheet 543. The second resilient section 5643 and the third resilient section 5645 each are in a substantially wavy shape. An extending direction of the second resilient section 5643 is substantially perpendicular to an extending direction of the third resilient section 5645. The second resilient section 5643 is connected between the first resilient section 5641 and the third resilient section 5645. The fourth resilient section 5646 is in a straight-strip shape. The fourth resilient section 5646 is connected between the second positioning sheet 562 and an end of the third resilient section 5645 away from the second resilient section 5643.

In the implementations, a thickness of the first positioning portion 54 is equal to a thickness of the second positioning portion 56, that is, in the initial state, the first positioning portion 54 and the second positioning portion 56 are on the same plane. Specifically, each first connection ring 52 is integrally formed on the same plane with the first positioning portion 54 and the second positioning portion 56 on the first connection ring 52.

Referring to FIGS. 2 to 4 and FIG. 7, FIG. 7 is a schematic exploded perspective structural view of the OIS mechanism in FIG. 2. The sliding pad 60 is made of a wear-resistant material, that is, the sliding pad 60 is made of a material having a low friction coefficient. For example, the sliding pad 60 may be made of, but is not limited to, polyoxymethylene resin. In the implementations, at least one sliding pad 60 is disposed between each magnetic member 32 and the planar coil 70, that is, at least one sliding pad 60 is disposed between each of the four magnetic members 32 and the planar coil 70, and the magnetic member 32 is attached to the planar coil 70 via the sliding pad 60. With the sliding pad 60, direct contact between the magnetic member 32 and the planar coil 70 can be avoided, thereby preventing the magnetic member 32 from damaging the planar coil 70 during sliding of the magnetic member 32 relative to the planar coil 70. Specifically, the sliding pad 60 is fixedly connected to the planar coil 70, and the magnetic member 32 is in contact with and slidable on the sliding pad 60. In the implementations, the sliding pad 60 is fixedly adhered to the planar coil 70, that is, the sliding pad 60 is fixedly connected to a front face of the planar coil 70 via an adhesive.

In other implementations, the sliding pad 60 may also be disposed between the frame 30 and the planar coil 70, the sliding pad 60 is fixedly connected to the planar coil 70, and the frame 30 is in contact with and slidable on the sliding pad 60. The sliding pad 60 can prevent direct contact between the frame 30 and the planar coil 70 and direct contact between the magnetic member 32 and the planar coil 70.

In other implementations, the sliding pad 60 may also be fixed to the planar coil 70 by snap-fitting or thermal fusion.

The planar coil 70 includes a support frame 71 and a coil (not illustrated) disposed in the support frame 71. The support frame 71 defines a through hole 72 at the middle of the support frame 71, the through hole 72 extends axially, and the coil is wound around the through hole 72. The sliding pads 60 are fixed on the front face of the planar coil 70 and arranged in a circumferential direction of the through hole 72. In the implementations, the support frame 71 is a rectangular plate. The support frame 71 defines slots 74 at corners of the support frame 71, and the support frame 71 is fixedly connected to the base 80 via the slots 74. The support frame 71 defines accommodation grooves 75 at two adjacent sides of a front face of the support frame 71, respectively, and each of the accommodation grooves 75 extends through the front face and a back face of the support frame 71.

The base 80 includes a base body 81 and the circuit board disposed in the base body 81. The base body 81 defines an accommodation hole 82 at the middle of a front face of the base body 81. The accommodation hole 82 is used for accommodating a sensor or a drive chip, etc. A welding portion 83 is disposed on an inner periphery of the accommodation hole 82 and electrically connected to the circuit board. The welding portion 83 is configured to be electrically connected to the coil of the planar coil 70. The base 80 is provided with a connection block 84 corresponding to the second positioning sheet 562 of the first resilient member 50, and the second positioning sheet 562 is fixedly connected to the connection block 84. In the implementations, the base body 81 is a rectangular body. The connection blocks 84 protrude from four corners of the front face of the base body 81, respectively, and four second positioning sheets 562 of the first resilient member 50 are connected to the four connection blocks 84, respectively. The base 80 is provided with positioning posts 86, and the positioning posts 86 are respectively snapped into the slots 74 of the planar coil 70 to position the planar coil 70 to the base 80. In the implementations, four positioning posts 86 are disposed on the front face of the base body 81 and arranged around the accommodation holes 82.

The base 80 is provided with a magnetic induction element 87 electrically connected to the circuit board, and the accommodation groove 75 of the planar coil 70 corresponds to the magnetic induction element 87. The planar coil 70 is disposed on the base 80, and the magnetic induction element 87 is accommodated in the accommodation groove 75, so that the magnetic induction element 87 corresponds to the magnetic member 32, and the magnetic induction element 87 is configured to determine a position of the frame 30. In the implementations, the magnetic induction elements 87 are soldered to the circuit board of the base 80. Specifically, the circuit board of the base 80 is provided with two solder pads 88 respectively corresponding to two adjacent magnetic members 32, and the two magnetic induction elements 87 are respectively soldered to the two solder pads 88 through surface-mount technology (SMT).

The base 80 is provided with multiple pins 801 electrically connected to the circuit board. The multiple pins 801 are soldered to a main board of an electronic device, so that the voice coil motor 100 can be electrically connected to the main board. In the implementations, a row of the pins 801 is disposed on each of two opposite sides of the base 80. Multiple connection blocks 803 are disposed on an outer periphery of the base 80. Specifically, the base 80 is provided with connection blocks 803 that protrude from each outer sidewall of the base 80 and are spaced from each other.

The voice coil motor 100 further includes a cover body 90. The cover body 90 includes a cover plate 91 and side plates 93 surrounding the cover plate 91. The cover plate 91 and the side plates 93 surround a space to define an accommodation space 94. The cover plate 91 defines a through hole 912 at the middle of the cover plate 91. The lens extends through the through hole 912, and the side plates 93 are fixedly connected to the base 80. In the implementations, the cover plate 91 is a rectangular plate, four edges of the rectangular plate are respectively connected to the side plates 93, each of the side plates 93 extends in the axial direction, and two positioning slots 932 are defined at one side of each of the side plates 93 away from the cover plate 91.

Referring to FIGS. 1 to 4 and FIGS. 8 to 11, during assembly of the voice coil motor 100, the multiple magnetic members 32 are respectively fixed in the multiple positioning grooves 312 of the frame 30; the coil assembly 40 is received in the accommodation space 33 of the frame 30, and the second resilient member 20 is disposed on the front face of the frame 30 and the front face of the coil assembly 40, so that the multiple positioning posts 421 of the carrier 42 are respectively snapped into the multiple fixing holes 223 of the second resilient member 20, the second connection ring 22 is fixedly connected to the carrier 42, and the second connection ring 22 surrounds the mounting hole 45 of the carrier 42; the positioning sheets 243 of the second resilient member 20 are respectively received in the first avoidance grooves 315 of the frame 30, the multiple connection posts 314 are respectively snapped into the positioning holes 245 of the positioning sheets 243, and at this point, each positioning portion 24 is resiliently connected between the coil assembly 40 and the frame 30. In other implementations, the fixing portion 221 may also be fixedly connected to the carrier 42 by adhesive bonding, snap-fitting, or the like, and the positioning sheet 243 may also be fixedly connected to the frame 30 by adhesive bonding, snap-fitting, or the like.

The first resilient member 50 is connected between the coil assembly 40 and the frame 30. Specifically, the first connection ring 52 is disposed at the positioning ring 422 on the back face of the carrier 42, so that the multiple fixing portions 521 of the first connection ring 52 face the multiple connection grooves 424, respectively. Each fixing portion 521 is connected to a corresponding connection groove 424 via an adhesive, that is, the adhesive is accommodated in the connection groove 424 and the through hole 5210 of the fixing portion 521, so that the fixing portion 521 is firmly connected to the carrier 42. The multiple first positioning sheets 543 are respectively disposed in the multiple second avoidance grooves 317, and the multiple fixing posts 316 are respectively snapped into the multiple connection holes 5432, so that the first positioning portion 54 is resiliently connected between the coil assembly 40 and the frame 30. In other implementations, the fixing portion 521 may also be connected to the coil assembly 40 by snap-fitting, screwing, or the like. The first positioning sheet 543 can be connected to the frame 30 by adhesive bonding, screwing, or the like.

The magnetic induction element 87 is soldered to the solder pad 88 of the base 80, and the planar coil 70 is disposed on the front face of the base 80, so that the multiple positioning posts 86 of the base 80 are respectively snapped into the multiple slots 74 of the planar coil 70. At this point, the planar coil 70 is fixedly connected to the base 80, and the magnetic induction element 87 is accommodated in a corresponding accommodation groove 75. In other implementations, the planar coil 70 may also be fixed to the base 80 by screwing or adhesive bonding. The frame 30 accommodating the coil assembly 40 is disposed on the planar coil 70, so that the four magnetic members 32 of the frame 30 are respectively supported by the four sliding pads 60 of the planar coil 70, and the four second positioning sheets 562 respectively face the four connection blocks 84 of the base 80. Each second positioning portion 56 is stretched towards the base 80, so that each second positioning sheet 562 is attached to a corresponding connection block 84, and then each second positioning sheet 562 is connected to a corresponding connection block 84 by welding, so that the second positioning portion 56 is resiliently connected between the frame 30 and the base 80. At this point, there is a height difference between the first positioning sheet 543 and a corresponding second positioning sheet 562, that is, the second branch 564 between the first positioning sheet 543 and the second positioning sheet 562 is resiliently deformed to have the pre-pressure for driving the frame 30 to move towards the base 80, so that the frame 30 is positioned on the base 80. Specifically, one end of the second branch 546 away from the first positioning sheet 543 bends toward the base 80. The cover body 90 covers the frame 30 so that the multiple connection blocks 803 of the base 80 are respectively snapped into the multiple positioning slots 932 of the cover body 90. In the implementations, the second positioning sheet 562 is closer to the base 80 than the first positioning sheet 543.

In other implementations, a height difference between the second positioning sheet 562 of the first resilient member 50 and a corresponding first positioning sheet 543 is preset, that is, the second positioning sheet 562 is farther away from the first connection ring 52 than the first positioning sheet 543. Specifically, one end of the second branch 564 away from the first positioning sheet 543 bends away from the first connection ring 52. When the first resilient member 50 is assembled on the base 80 and the frame 30, the first positioning sheet 543 and the second positioning sheet 562 are on the same plane, and at this point, the second branch 564 between the first positioning sheet 543 and the second positioning sheet 562 is resiliently deformed to have the pre-pressure for driving the frame 30 to move towards the base 80, so that the frame 30 is positioned on the base 80.

When the coil 44 is energized, the first electromagnetic force is generated between the coil 44 on the coil assembly 40 and the magnetic member 32 on the frame 30. The first electromagnetic force pushes the coil assembly 40 to move in the axial direction, that is, the first electromagnetic force pushes the coil assembly 40 to move up/down in the axial direction in the accommodation space 33 of the frame 30, so that an autofocus function of the lens attached to the carrier 42 can be achieved. During movement of the coil assembly 40, the positioning portion 24 of the second resilient member 20 and the first positioning portion 54 of the first resilient member 50 are resiliently deformed, and the positioning portion 24 of the second resilient member 20 and the first positioning portion 54 of the first resilient member 50 can restore to reset the coil assembly 40 after the first electromagnetic force is removed. Meanwhile, the second electromagnetic force is generated between the magnetic member 32 of the frame 30 and the planar coil 70, the second electromagnetic force pushes the frame 30 and drives the coil assembly 40 attached with the lens to move along the XOY plane in the accommodation space 94 of the cover body 90 to compensate lens shaking, and the magnetic member 32 slides on a corresponding sliding pad 60, achieving the OIS function. During movement of the frame 30, the second branch 564 of the second positioning portion 56 is resiliently deformed, and the second branch 564 can restore to reset the frame and the coil assembly 40 together after the second electromagnetic force is removed.

Since the second positioning portion 56 has a resilient force for pre-pressing the frame 30 onto the planar coil 70, the frame 30 has a tendency to approach the planar coil 70. The sliding pad 60 is provided between the magnetic member 32 and the planar coil 70, a small friction force is achieved with the sliding pad 60, and the first branch 541 and the second branch 564 have anti-actuation forces to reset the coil assembly 40 and the frame 30 after movement of the coil assembly 40 and the frame 30.

In the voice coil motor 100 of the disclosure, the first resilient member 50 is adopted, and the first resilient member 50 is connected to the coil assembly 40, the frame 30, and the base 80. Thus, the voice coil motor 100 has a higher reliability than an existing voice coil motor on the market. In addition, a suspended-wire system of the existing voice coil motor on the market is replaced with the first resilient member 50 and the sliding pad 60, and the second branch 564 pre-presses the frame 30 onto the planar coil 70, thereby improving the reliability of the voice coil motor 100, and avoiding a reliability risk of a suspension type system of an existing suspended-wire OIS motor on the market. Secondly, the sliding pad 60 is relatively thin, so that the thickness of the sliding pad 60 is less than a diameter of a ball in a ball-type OIS motor in the related art. Therefore, a thickness of the voice coil motor 100 in the axial direction is reduced, so that the overall thickness of the voice coil motor 100 is reduced, thereby reducing an inner space of the electronic device occupied by the voice coil motor 100 and facilitating arrangement of other electronic elements in the electronic device. Furthermore, the first resilient member 50 is designed to have an open-loop structure with a relatively low cost, and both the first branch 541 and the second branch 564 have resilient curved configurations, that is, both the first branch 541 and the second branch 564 can be resiliently deformed and reset. As a result, a low-cost open-loop solution can be employed for the voice coil motor 100. Moreover, during production of the voice coil motor 100, processes can be simplified, automation can be enhanced, the production efficiency can be improved, and the cost can be reduced.

Figure 12:
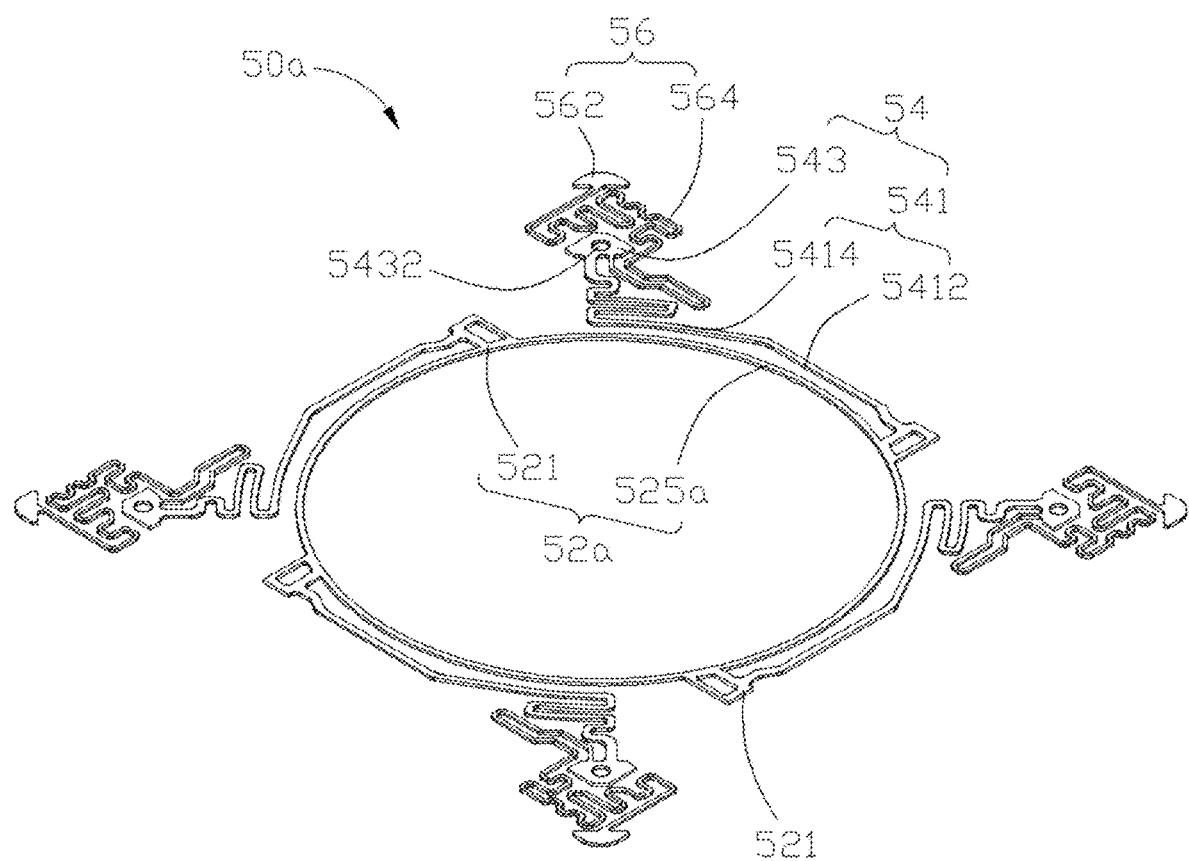
FIG. 12 is a schematic structural view of a first resilient member provided in another implementation of the disclosure.

Referring to FIG. 5 and FIG. 12, FIG. 12 is a schematic structural view of a first resilient member 50a provided in another implementation of the disclosure. The first resilient member 50a in the another implementation of the disclosure is similar to the first resilient member 50 in one of the above implementations in structure, except that a first connection ring 52a of the first resilient member 50a has a closed-loop structure. Specifically, the first connection ring 52a includes a connection branch 525a that is annular and fixing portions 521 arranged around the connection branch 525a, and the first positioning portion 54 is connected to the fixing portion 521. In the implementations, the connection branch 525a a is annular, four fixing portions 521 are disposed at an outer periphery of the connection branch 525a and are evenly arranged at intervals in a circumferential direction of the connection branch 525a. Each fixing portion 521 is connected to the first positioning portion 54, and the first positioning portion 54 is connected to the second positioning portion 56. The first resilient member 50a has the same assembly relationship and function as the first resilient member 50, which are not described in detail herein.

Figure 13:
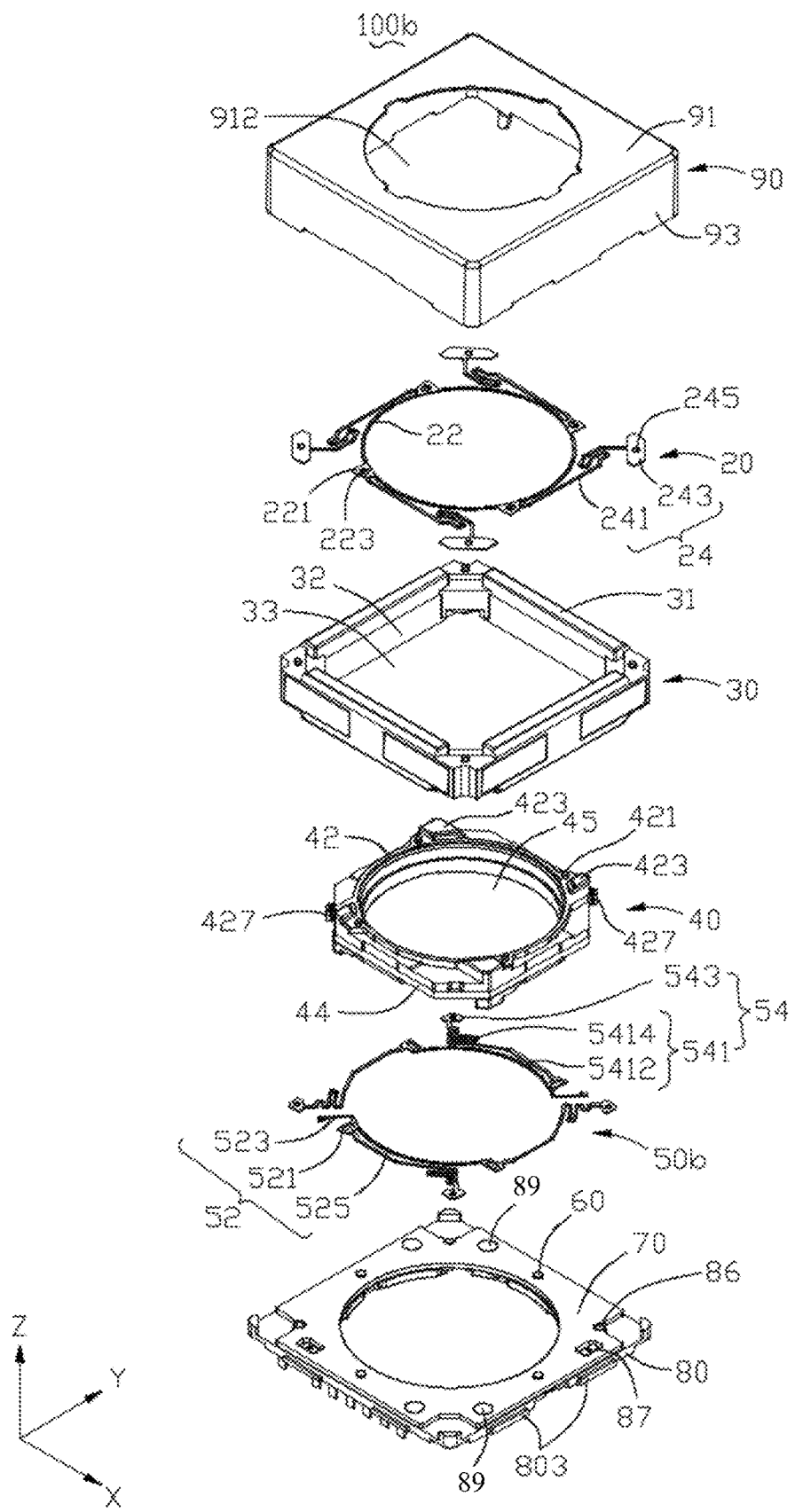
FIG. 13 is a schematic exploded perspective structural view of a voice coil motor provided in another implementation of the disclosure.

Referring to FIG. 5 and FIG. 13, FIG. 13 is a schematic exploded perspective structural view of a voice coil motor 110b provided in another implementation of the disclosure. The voice coil motor 100b in the another implementation of the disclosure is similar to the voice coil motor 100 in one of the above implementations in structure, except that the second positioning portion 56 of the first resilient member 50 in one of the above implementations is absent in the first resilient member 50b of the voice coil motor 100b, and instead, a magnetic attraction between the frame 30 and the base 80 serves as a positioning mechanism between the frame 30 and the base 80, that is, the magnetic attraction between the frame 30 and the base 80 replaces the second positioning portion 56 of the first resilient member 50. Specifically, the first resilient member 50b only includes the first connection ring 52 and the first positioning portion 54 connected to the outer periphery of the first connection ring 52, the fixing portion 521 of the first connection ring 52 is connected to the carrier 42, and the first positioning sheet 543 is connected to the frame 30. In the implementations, the positioning mechanism is disposed on the base 80 and corresponds to the magnetic attraction member 89 of the magnetic member 32, and the magnetic member 32 and the magnetic attraction member 89 cooperate to position the frame 30 to the base 80. Specifically, the base 80 is provided with at least one magnetic attraction member 89 corresponding to each magnetic member 32, and the magnetic member 32 and the magnetic attraction member 89 are attracted to each other, so that the frame 30 and the coil assembly 40 accommodated in the frame 30 are positioned on the base 80. In the implementations, each magnetic attraction member 89 extends through the planar coil 70 and exceeds the front face of the planar coil 70, and each magnetic member 32 is slidably connected to the planar coil 70 via the sliding pad 60, direct contact between the magnetic member 32 and the planar coil 70 can be avoided, thereby preventing the magnetic member 32 from damaging the planar coil 70 during sliding of the magnetic member 32 relative to the planar coil 70. The second positioning portion 56 is absent in the first resilient member 50b, and processes for manufacturing the first resilient member 50b are simplified, thereby further reducing the production cost of the voice coil motor 100b.

Figure 14:
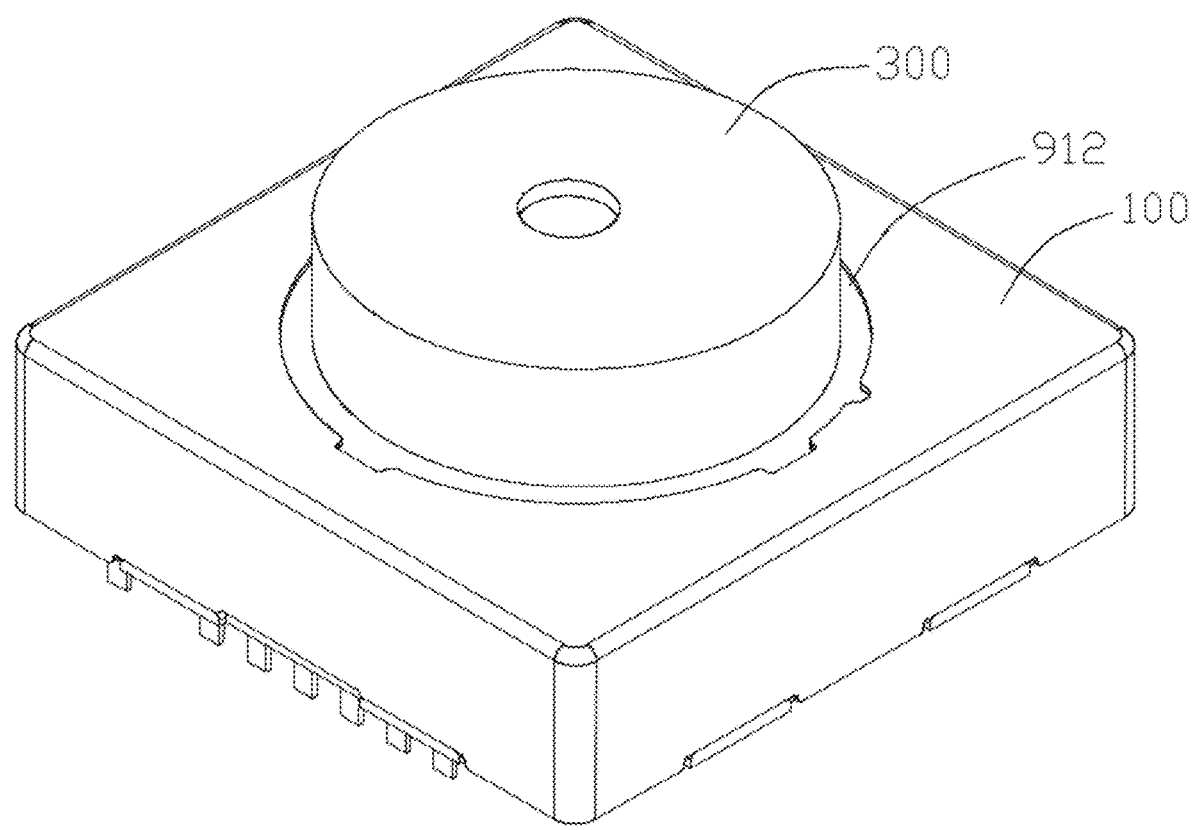
FIG. 14 is a schematic perspective structural view of a camera provided in an implementation of the disclosure.

Referring to FIG. 3 and FIG. 14, FIG. 14 is a schematic perspective structural view of a camera provided in an implementation of the disclosure. The camera includes the voice coil motor 100/100b and a lens module 300. The lens module 300 is disposed in the voice coil motor 100/100b. The voice coil motor 100/100b is configured to drive the lens module 300 to move. Specifically, a rear end of the lens module 300 passes through an inner cavity of the second connection ring 22 and is connected to the mounting hole 45 of the carrier 42, and a front end of the lens module 300 passes through the through hole 912 of the cover body 90 to be exposed to the outside of the cover body 90. During usage of the camera, the coil assembly 40 is energized so that the first electromagnetic force is generated between the coil assembly 40 and the magnetic member 32, the first electromagnetic force drives the coil assembly 40 to move axially, and the coil assembly 40 drives the lens module 300 to move together, thereby achieving the autofocus function. The planar coil 70 is energized so that the second electromagnetic force is generated between the planar coil 70 and the magnetic member 32, the second electromagnetic force drives the frame 30 and drives the coil assembly 40 attached with the lens module 300 to move along the XOY plane, compensating lens shaking and thus achieving the OIS function.

Figure 15:
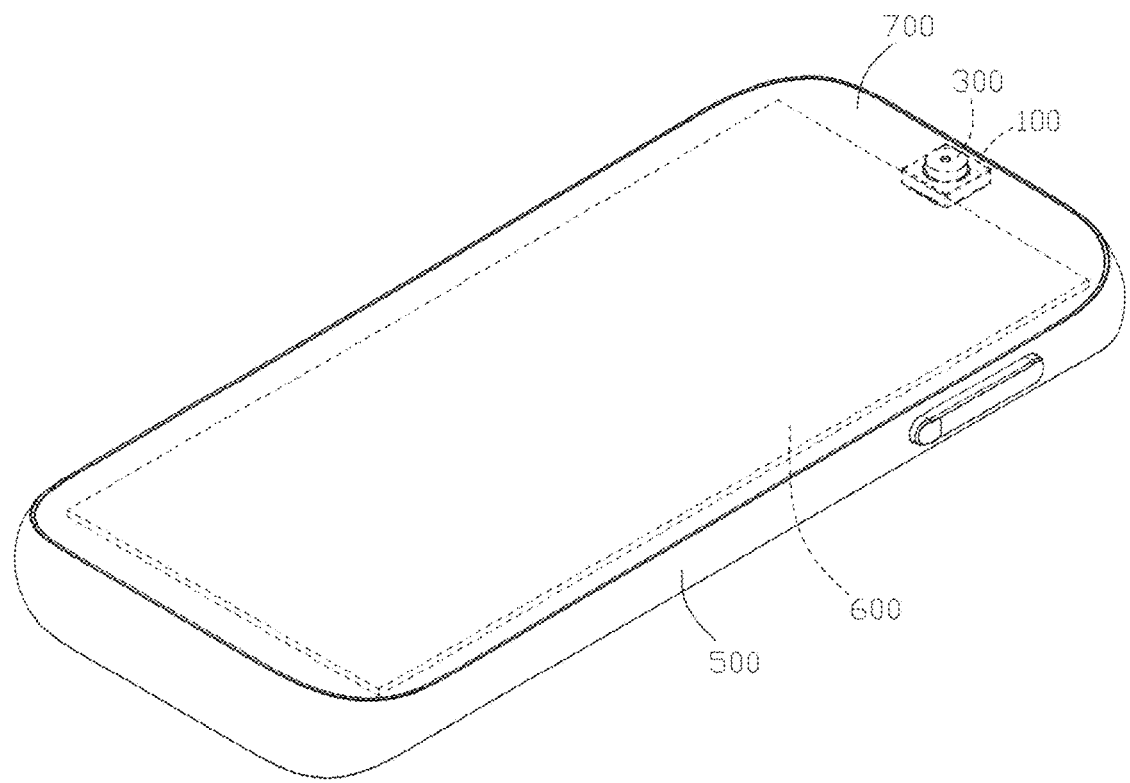
FIG. 15 is a schematic perspective structural view of an electronic device provided in an implementation of the disclosure.

Referring to FIG. 15, FIG. 15 is a schematic perspective structural view of an electronic device provided in an implementation of the disclosure. The electronic device includes a housing 500, a main board 600 disposed inside the housing 500, a display screen 700 disposed on a front face of the housing 500, and the camera. The camera is disposed inside the housing 500, and the camera and the display screen 700 are electrically connected to the main board 600. In the implementations, the electronic device is a mobile phone, and the lens module 300 is a front camera on the mobile phone. Since the overall thickness of the voice coil motor is reduced, an inner space of the housing 500 occupied by the voice coil motor is reduced, thereby facilitating arrangement of other electronic elements. In other implementations, the lens module 300 may also be a rear camera.

In other implementations, the electronic device may also be, but is not limited to, any electronic device that needs to be provided with a lens, such as a tablet computer, a display screen, a smart television, an electronic watch, and a smart bracelet.

The above are only some implementations of the disclosure. It is noted that, a person skilled in the art may make further improvements and modifications without departing from the principle of the disclosure, and these improvements and modifications shall also belong to the scope of protection of the disclosure.

What is claimed is:

1. A voice coil motor, comprising:
a frame, a magnetic member disposed at the frame, a coil assembly received in an inner cavity of the frame, a first resilient member, a planar coil, and a base;
wherein the magnetic member is disposed around the coil assembly, the planar coil is disposed on the base, the frame is disposed on the planar coil, and the first resilient member comprises a first connection ring connected to the coil assembly and a first positioning portion; and
wherein the coil assembly is connected to the frame via the first positioning portion, the first positioning portion is configured to reset the coil assembly after movement of the coil assembly relative to the frame, and a positioning mechanism is disposed between the frame and the base and configured to reset the frame after movement of the frame relative to the base;
wherein the coil assembly comprises a carrier, the first connection ring comprises a fixing portion connected to the carrier; wherein the first positioning portion comprises a first branch connected to the fixing portion and a first positioning sheet disposed at one end of the first branch away from the fixing portion, the first branch is resilient, and the first positioning sheet is connected to the frame.

2. The voice coil motor of claim 1, wherein the coil assembly further comprises a coil wound around the carrier, the first connection ring further comprises a connection portion connected to the coil, and the first positioning portion is connected to the fixing portion.

3. The voice coil motor of claim 2, wherein the first connection ring has an open-loop structure and further comprises at least two connection branches, wherein each of the at least two connection branches extends in a circumferential direction of the first connection ring, and the at least two connection branches define the open-loop structure, each of both ends of each of the at least two connection branches is provided with the fixing portion, and one of the both ends of each of the at least two connection branches is provided with the connection portion close to the fixing portion.

4. The voice coil motor of claim 1, wherein the first branch comprises an extension section extending in a circumferential direction of the first connection ring and a first branching section connected between the extension section and the first positioning sheet.

5. The voice coil motor of claim 4, wherein the first branching section extends in a radial direction of the first connection ring.

6. The voice coil motor of claim 1, wherein the positioning mechanism is a second positioning portion connected to the first positioning portion, the frame is connected to the base via the second positioning portion, and the second positioning portion is configured to position the frame to the base.

7. The voice coil motor of claim 6, wherein a thickness of the first positioning portion is equal to a thickness of the second positioning portion, and the first positioning portion and the second positioning portion are on a same plane in an initial state.

8. The voice coil motor of claim 6, wherein the second positioning portion comprises a second positioning sheet connected to the base and a second branch connected between the first positioning sheet and the second positioning sheet, the second branch has a pre-pressure for driving the frame to move towards the base, and the second branch is further configured to reset the frame after movement of the frame.

9. The voice coil motor of claim 8, wherein the second branch comprises a first resilient section connected to the first positioning sheet, a second resilient section connected to the first resilient section, a third resilient section connected to the second resilient section, and a fourth resilient section connected between the third resilient section and the second positioning sheet, and the first resilient section, the second resilient section, and the third resilient section surround the first positioning sheet.

10. The voice coil motor of claim 8, wherein the base is provided with a connection block corresponding to the second positioning sheet, the second positioning sheet is fixedly connected to the connection block, and the second positioning sheet is closer to the base than the first positioning sheet.

11. The voice coil motor of claim 2, wherein the first connection ring has a closed-loop structure, the first connection ring comprises a connection branch that is annular and fixing portions arranged around the connection branch, and the first positioning portion is connected to the fixing portions.

12. The voice coil motor of claim 1, wherein the positioning mechanism comprises a magnetic attraction member disposed at the base, and the magnetic member and the magnetic attraction member cooperate to position the frame to the base.

13. The voice coil motor of claim 1, further comprising a sliding pad disposed between the planar coil and the frame and/or between the planar coil and the magnetic member, wherein the frame and the magnetic member are slidably disposed on the planar coil via the sliding pad.

14. The voice coil motor according to claim 13, wherein the sliding pad is fixedly connected to the planar coil, and the magnetic member on the frame is in contact with and slidable on the sliding pad.

15. The voice coil motor of claim 1, wherein the base is provided with a magnetic induction element, the planar coil defines an accommodation groove corresponding to the magnetic induction element, the magnetic induction element is accommodated in the accommodation groove, so that the magnetic induction element corresponds to the magnetic member, and the magnetic induction element is configured to determine a position of the frame.

16. The voice coil motor of claim 1, wherein the base is provided with a positioning post, the planar coil defines a slot corresponding to the positioning post, and the positioning post is snapped into the slot to position the planar coil to the base.

17. The voice coil motor of claim 1, wherein the base is provided with a magnetic attraction member corresponding to the magnetic member, and the magnetic member and the magnetic attraction member cooperate to position the frame to the base.

18. A camera comprising:
a voice coil motor and a lens module;
wherein the voice coil motor comprises a frame, a magnetic member disposed at the frame, a coil assembly received in an inner cavity of the frame, a first resilient member, a planar coil, and a base;
wherein the magnetic member is disposed around the coil assembly, the planar coil is disposed on the base, the frame is disposed on the planar coil, and the first resilient member comprises a first connection ring connected to the coil assembly and a first positioning portion; and
wherein the coil assembly is connected to the frame via the first positioning portion, the first positioning portion is configured to reset the coil assembly after movement of the coil assembly relative to the frame, and a positioning mechanism is disposed between the frame and the base and configured to reset the frame after movement of the frame relative to the base; and
wherein the lens module is disposed at the voice coil motor, and the voice coil motor is configured to drive the lens module to move;
wherein the coil assembly comprises a carrier, the first connection ring comprises a fixing portion connected to the carrier; wherein the first positioning portion comprises a first branch connected to the fixing portion and a first positioning sheet disposed at one end of the first branch away from the fixing portion, the first branch is resilient, and the first positioning sheet is connected to the frame.

19. An electronic device, comprising:
a housing, a main board disposed inside the housing, and a camera disposed inside the housing and electrically connected to the main board;
wherein the camera comprises a voice coil motor and a lens module, wherein the voice coil motor comprises a frame, a magnetic member disposed at the frame, a coil assembly received in an inner cavity of the frame, a first resilient member, a planar coil, and a base;
wherein the magnetic member is disposed around the coil assembly, the planar coil is disposed on the base, the frame is disposed on the planar coil, and the first resilient member comprises a first connection ring connected to the coil assembly and a first positioning portion;
wherein the coil assembly is connected to the frame via the first positioning portion, the first positioning portion is configured to reset the coil assembly after movement of the coil assembly relative to the frame, and a positioning mechanism is disposed between the frame and the base and configured to reset the frame after movement of the frame relative to the base; and
wherein the lens module is disposed at the voice coil motor, and the voice coil motor is configured to drive the lens module to move;
wherein the coil assembly comprises a carrier, the first connection ring comprises a fixing portion connected to the carrier; wherein the first positioning portion comprises a first branch connected to the fixing portion and a first positioning sheet disposed at one end of the first branch away from the fixing portion, the first branch is resilient, and the first positioning sheet is connected to the frame.

* * * * *